United States Patent
da Silva et al.

(10) Patent No.: US 11,865,715 B2
(45) Date of Patent: *Jan. 9, 2024

(54) OFFLINE OPTIMIZATION TO ROBOT BEHAVIOR

(71) Applicant: Boston Dynamics, Inc., Waltham, MA (US)

(72) Inventors: Marco da Silva, Waltham, MA (US); Benjamin Stephens, Somerville, MA (US); Alfred Anthony Rizzi, Waltham, MA (US); Yeuhi Abe, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/443,075

(22) Filed: Jul. 20, 2021

(65) Prior Publication Data
US 2021/0347041 A1 Nov. 11, 2021

Related U.S. Application Data

(63) Continuation of application No. 16/108,919, filed on Aug. 22, 2018, now Pat. No. 11,084,167, which is a
(Continued)

(51) Int. Cl.
*B25J 9/16* (2006.01)
*B62D 57/032* (2006.01)

(52) U.S. Cl.
CPC ........... *B25J 9/1605* (2013.01); *B25J 9/162* (2013.01); *B25J 9/1633* (2013.01);
(Continued)

(58) Field of Classification Search
CPC ........ B25J 9/1605; B25J 9/162; B25J 9/1633; B25J 9/0006; B25J 9/163; B62D 57/032;
(Continued)

(56) References Cited

U.S. PATENT DOCUMENTS

| 5,121,805 A | 6/1992 | Collie |
| 5,930,990 A | 8/1999 | Zachary et al. |

(Continued)

FOREIGN PATENT DOCUMENTS

| EP | 0965416 | 12/1999 |
| EP | 1642687 | 4/2006 |
| EP | 1721711 | 11/2006 |

OTHER PUBLICATIONS

"Flexible Muscle-Based Locomotion for Bipedal Creatures," Geijtenbeek et al., ACM Transactions on Graphics, vol. 32, Nr. 6, 2013, 11 pages.
(Continued)

*Primary Examiner* — Bao Long T Nguyen
(74) *Attorney, Agent, or Firm* — Knobbe, Martens, Olson & Bear, LLP

(57) ABSTRACT

A computing system may provide a model of a robot. The model may be configured to determine simulated motions of the robot based on sets of control parameters. The computing system may also operate the model with multiple sets of control parameters to simulate respective motions of the robot. The computing system may further determine respective scores for each respective simulated motion of the robot, wherein the respective scores are based on constraints associated with each limb of the robot and a predetermined goal. The constraints include actuator constraints and joint constraints for limbs of the robot. Additionally, the computing system may select, based on the respective scores, a set of control parameters associated with a particular score. Further, the computing system may modify a behavior of the robot based on the selected set of control parameters to perform a coordinated exertion of forces by actuators of the robot.

20 Claims, 13 Drawing Sheets

Related U.S. Application Data continuation of application No. 15/230,776, filed on Aug. 8, 2016, now Pat. No. 10,093,019, which is a continuation of application No. 14/584,558, filed on Dec. 29, 2014, now Pat. No. 9,440,353.

(52) U.S. Cl.
CPC ............ *B62D 57/032* (2013.01); *Y10S 901/01* (2013.01); *Y10S 901/02* (2013.01); *Y10S 901/28* (2013.01)

(58) Field of Classification Search
CPC .... Y10S 901/01; Y10S 901/02; Y10S 901/28; G05B 2219/40305; G05B 2219/40314; G05B 2219/40318
See application file for complete search history.

(56) References Cited

U.S. PATENT DOCUMENTS

| | | |
|---|---|---|
| 6,295,484 B1 | 9/2001 | Ojima et al. |
| 6,445,964 B1 | 9/2002 | White et al. |
| 6,553,768 B1 | 4/2003 | Trewin et al. |
| 6,584,377 B2 | 6/2003 | Saijo et al. |
| 6,594,552 B1 | 7/2003 | Nowlin et al. |
| 6,643,563 B2 | 11/2003 | Hosek et al. |
| 7,353,656 B2 | 4/2008 | Bolis et al. |
| 7,712,301 B1 | 5/2010 | Wagner |
| 7,904,207 B2 | 3/2011 | Nagatsuka et al. |
| 8,242,730 B2 | 8/2012 | Nichols et al. |
| 8,271,138 B2 | 9/2012 | Eliuk et al. |
| 8,475,117 B2 | 7/2013 | Andrew |
| 8,583,285 B2 | 11/2013 | Aurnhammer et al. |
| 8,639,386 B2 | 1/2014 | Summer et al. |
| 8,644,986 B2 * | 2/2014 | Tsuboi ................... B25J 9/1612 414/6 |
| 9,440,353 B1 * | 9/2016 | da Silva ................. B25J 9/1605 |
| 10,093,019 B1 * | 10/2018 | Silva ....................... B25J 9/1633 |
| 11,084,167 B1 * | 8/2021 | Silva ....................... B25J 9/1633 |
| 2002/0083712 A1 | 7/2002 | Tomlinson et al. |
| 2003/0120388 A1 | 6/2003 | Kuroki et al. |
| 2005/0113973 A1 | 5/2005 | Endo et al. |
| 2005/0240307 A1 | 10/2005 | Kuroki et al. |
| 2007/0021868 A1 * | 1/2007 | Nagatsuka ........... G05B 19/416 700/245 |
| 2007/0050088 A1 | 3/2007 | Murray et al. |
| 2007/0073442 A1 | 3/2007 | Aghili et al. |
| 2007/0168080 A1 | 7/2007 | Takenaka et al. |
| 2007/0260356 A1 | 11/2007 | Kock et al. |
| 2008/0208391 A1 | 8/2008 | Hasegawa et al. |
| 2009/0320440 A1 | 12/2009 | Erickson et al. |
| 2010/0036526 A1 | 2/2010 | Erickson |
| 2010/0324699 A1 | 12/2010 | Herr et al. |
| 2011/0022232 A1 | 1/2011 | Yoshiike et al. |
| 2011/0042836 A1 | 2/2011 | Zhang et al. |
| 2011/0066283 A1 | 3/2011 | Hammam et al. |
| 2011/0098856 A1 | 4/2011 | Yoshiike et al. |
| 2011/0098857 A1 | 4/2011 | Yoshiike et al. |
| 2011/0098860 A1 | 4/2011 | Yoshiike et al. |
| 2011/0213496 A1 | 9/2011 | Orita |
| 2012/0265498 A1 | 10/2012 | Choi et al. |
| 2012/0303162 A1 | 11/2012 | Orita |
| 2013/0054021 A1 | 2/2013 | Murai et al. |
| 2013/0184870 A1 * | 7/2013 | Ota ........................ B25J 9/1669 700/262 |
| 2013/0310979 A1 | 11/2013 | Herr et al. |
| 2014/0121832 A1 | 5/2014 | Sasai |
| 2014/0249670 A1 | 9/2014 | Yamane |
| 2014/0257558 A1 | 9/2014 | Frische et al. |
| 2015/0051734 A1 | 2/2015 | Zheng et al. |
| 2015/0199458 A1 | 7/2015 | Bacon et al. |
| 2015/0202768 A1 | 7/2015 | Moridaira |

OTHER PUBLICATIONS

International Search Report and Written Opinion dated May 30, 2016 for Application No. PCT/US2015/045253, filed Aug. 14, 2015, in 16 pages.

European Extended Search Report dated Sep. 26, 2017 for Application No. 17168343.6 in 15 pages.

* cited by examiner

| | | |
|---|---|---|
| Set 1010 | | |
| Joint | Start: | 120° |
| | End: | 180° |
| | Limit: | 90° – 180° |
| | 189° | |
| Actuator | Start: | 10 N |
| | End: | 5 N |
| | Limit: | 0 N – 15 N |
| | 18 N | |
| Duration | | 0.8 s |
| Score | | 5.25 |

| | | |
|---|---|---|
| Set 1020 | | |
| Joint | Start: | 120° |
| | End: | 170° |
| | Limit: | 90° – 180° |
| | 171° | |
| Actuator | Start: | 8 N |
| | End: | 4 N |
| | Limit: | 0 N – 15 N |
| | 10 N | |
| Duration | | 1.2 s |
| Score | | 1.5 |

Figure 10

OFFLINE OPTIMIZATION TO ROBOT BEHAVIOR

CROSS-REFERENCE TO RELATED APPLICATION

This patent application is a continuation of, and claims priority under 35 U.S.C. § 120 from, U.S. patent application Ser. No. 16/108,919, filed on Aug. 22, 2018, which is a continuation of U.S. patent application Ser. No. 15/230,776, filed on Aug. 8, 2016, which is a continuation of U.S. patent application Ser. No. 14/584,558, filed on Dec. 29, 2014. The disclosures of these prior applications are considered part of the disclosure of this application and are hereby incorporated by reference in their entireties.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to determining a coordinated motion for a robot. An example implementation may include providing a model of a robot. The model may be configured to determine simulated motions of the robot based on sets of control parameters. Subsets of the control parameters collectively represent a coordinated exertion of forces by respective actuators of the robot during a period of time. The implementation may also include operating the model with multiple sets of control parameters to simulate respective motions of the robot. The implementation may further include determining respective scores for each respective simulated motion of the robot. The respective scores may be based on constraints associated with each limb of the robot and a predetermined goal. The constraints include actuator constraints and joint constraints for one or more limbs of the robot. In addition, the implementation may include selecting, based on the respective scores, a set of control parameters associated with a particular score. Further, the implementation may include modifying a behavior of the robot based on the selected set of control parameters to perform the coordinated exertion of forces by the actuators of the robot.

In another example implementation, the present application describes a non-transitory computer-readable medium having instructions stored thereon that, upon execution by at least one processor, performs a set of operations. The operations may include providing a model of a robot. The model may be configured to determine simulated motions of the robot based on sets of control parameters. Subsets of the control parameters collectively represent a coordinated exertion of forces by respective actuators of the robot during a period of time. The operations may also include operating the model with multiple sets of control parameters to simulate respective motions of the robot. The operations may further include determining respective scores for each respective simulated motion of the robot. The respective scores may be based on constraints associated with each limb of the robot and a predetermined goal. The constraints include actuator constraints and joint constraints for one or more limbs of the robot. In addition, the operations may include selecting, based on the respective scores, a set of control parameters associated with a particular score. Further, the operation may include modifying a behavior of the robot based on the selected set of control parameters to perform the coordinated exertion of forces by the actuators of the robot.

In yet another example implementation, the present application describes a system that includes a robot, a network interface, at least one processor, a memory, and program logic stored on the memory. The memory may have stored thereon a model of a robot. The model may be configured to determine simulated motions of the robot based on sets of control parameters. Subsets of the control parameters collectively represent a coordinated exertion of forces by respective actuators of the robot during a period of time. The program logic may be executable by the at least one processor and cause the system to perform a set of operations. The operations may include operating the model with multiple sets of control parameters to simulate respective motions of the robot. The operations may also include determining respective scores for each respective simulated motion of the robot. The respective scores may be based on constraints associated with each limb of the robot and a predetermined goal. The constraints include actuator constraints and joint constraints for one or more limbs of the robot. In addition, the operations may include selecting, based on the respective scores, a set of control parameters associated with a particular score. Further, the operation may include modifying a behavior of the robot based on the selected set of control parameters to perform the coordinated exertion of forces by the actuators of the robot.

In yet still another implementation, the present application describes a system. The system may include a means for providing a model of a robot. The model may be configured to determine simulated motions of the robot based on sets of control parameters. Subsets of the control parameters collectively represent a coordinated exertion of forces by respective actuators of the robot during a period of time. The system may also include a means for operating the model with multiple sets of control parameters to simulate respective motions of the robot. The system may further include a means for determining respective scores for each respective simulated motion of the robot. The respective scores may be based on constraints associated with each limb of the robot and a predetermined goal. The constraints include actuator constraints and joint constraints for one or more limbs of the robot. In addition, the system may include a means for selecting a set of control parameters associated with a particular score based on the respective scores. Further, the system may include a means for modifying a behavior of the robot based on the selected set of control parameters to perform the coordinated exertion of forces by the actuators of the robot.

These as well as other aspects, advantages, and alternatives, will become apparent to those of ordinary skill in the art by reading the following detailed description, with reference where appropriate to the accompanying figures. Further, it should be understood that this overview and other description throughout this document is merely for purposes of example and is not intended to limit the scope of the invention as claimed.

BRIEF DESCRIPTION OF THE FIGURES

FIG. 10 illustrates example sets of control parameters and their respective scores, according to an example implementation.

DETAILED DESCRIPTION

Figure 1:
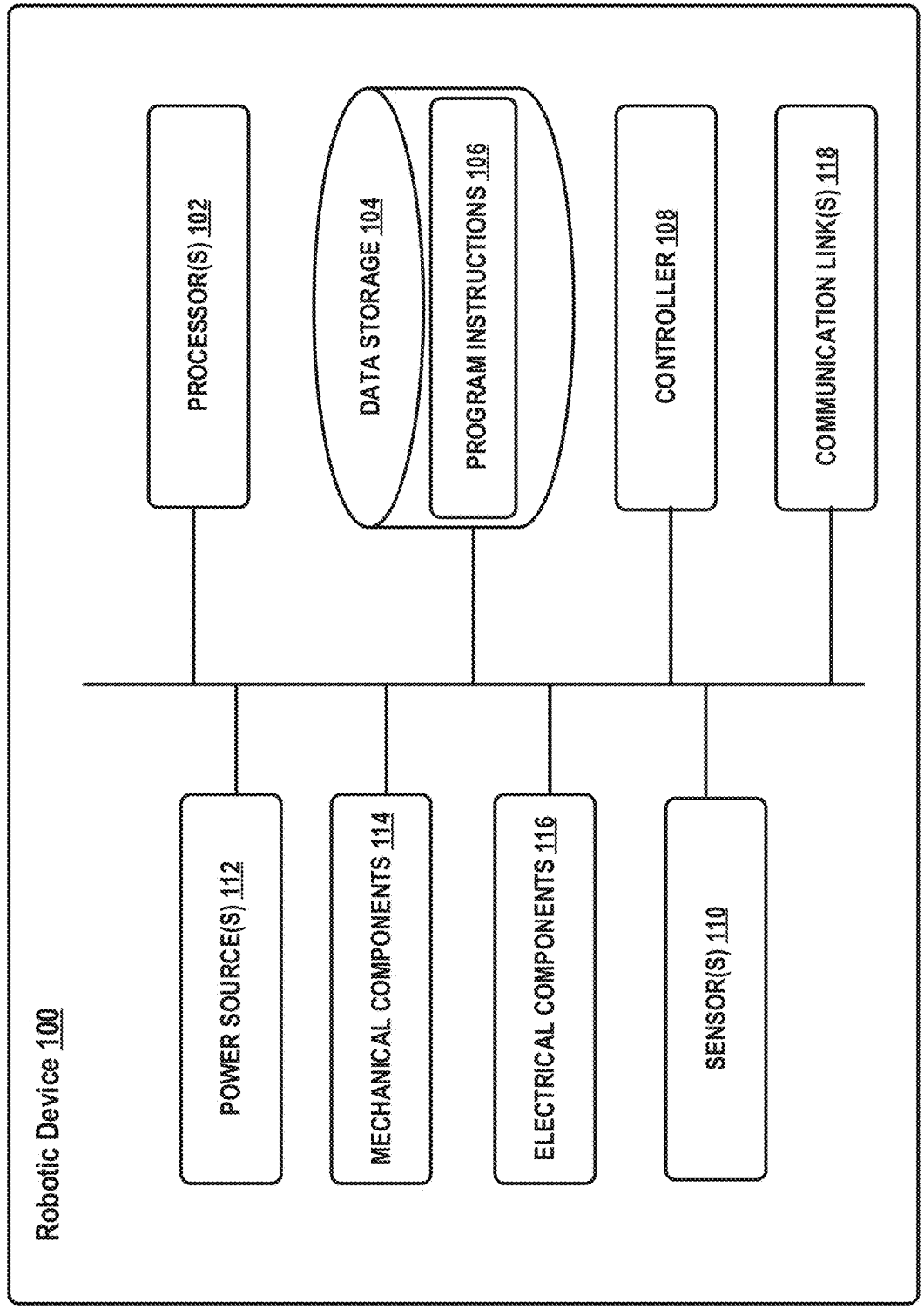
FIG. 1 illustrates a configuration of a robotic system, according to an example implementation.

The following detailed description describes various features and operations with reference to the accompanying figures. The illustrative implementations described herein are not meant to be limiting. It may be readily understood that certain aspects of the disclosed implementations can be arranged and combined in a wide variety of different configurations, all of which are contemplated herein.

I. Overview

An example implementation involves a robot configured with at least one robotic limb, sensors, and a control system. The robotic limb may include a number of members (e.g. 2-5 members) connected by joints, allowing the members to rotate about the joints in at least one degree of freedom. The robotic limb may also include a number of actuators (e.g. 2-5 actuators) coupled to the members of the limb that facilitate movement of the members about the joints through a certain range motion.

A given actuator may have physical limitations that constrain aspects of its operation, such as maximum instantaneous and sustained forces that it can exert, among other constraints. The sensors may be configured to measure properties of the robot and its robotic mechanisms, such as joint angles, forces and/or torques applied by actuators, and the position, velocity, and/or acceleration of the members of the robotic limb at a given point in time. The sensors may provide information, typically in the form of an electrical signal, to the control system of the robot. The control system may then use that information as feedback, along with other control inputs, in order to control the robot.

The control system of the robot may be configured to receive feed-forward control inputs, in addition to feedback signals, that influence the robot's motion. In some instances, the control system of the robot may be configured to maintain a steady-state operation such as maintaining balance, or a cyclic behavior such as trotting or running. Under various circumstances, however, it may be desired to have the robot perform certain non-cyclic or episodic tasks in addition to its steady-state operation. A computing system may introduce feed-forward control inputs to the robot's control system, which may affect the feedback behavior of the robot for a duration of time. In this manner, the robot may move a certain way in response to the robot's control system being provided a set of feed-forward control inputs corresponding to those tasks.

The feed-forward control inputs (which may also be referred to herein as "control parameters") may instruct the control system to operate the robot's limbs to desired joint angles and with desired actuator forces. In some instances, a set of feed-forward control inputs may include a starting set of joint angles and actuator forces, an ending set of joint angles and actuator forces, and a duration of time. In these instances, providing the set of feed-forward control inputs to the robot's control system may produce a transient motion by operating the robot from a starting state to an ending state. The starting and ending states may each correspond to a set of joint angles and actuator forces. The transition between the starting state and ending state may occur over the duration of time. Upon completion of the transient motion, the control system may resume the feedback-based cyclic, steady-state, or any other selected operation being performed prior to receiving the feed-forward control inputs.

Note that, at any point during the operation of the robot, both feed-forward control and feedback control may influence the robot's motion. While operating in a cyclic or steady-state manner, feed-forward control may also be applied in addition to feedback control. While operating in a non-cyclic or episodic manner, feedback control may continue to be applied in addition to feed-forward control. Thus, regardless of whether the robot is maintaining balance, walking, or performing a coordinated transient motion, both feed-forward and feedback control can affect the robot's motion.

In some cases, a set of feed-forward control inputs includes a number of subsets of feed-forward control inputs, with each subset representing forces to exert by one or more actuators of the robot during a period of time. The subsets of feed-forward control inputs collectively represent a coordinated exertion of forces that, when carried out by the robot's actuators, cause the robot to perform the coordinated motion. A given subset of feed-forward control inputs might represent the forces to exert by the actuators of a particular limb of the robot. Certain sets of feed-forward control inputs may synchronously operate each limb in order to achieve a coordinated motion.

A coordinated motion of the robot may involve operating part or all of the robot's body and/or limbs. In some instances, the coordinated motion includes operating one or more actuators and/or joints of the robot over a given duration of time. Certain circumstances may require modulating the extent of force exerted by the robot's actuators such that no apparent motion is produced. The modulation of the forces of robot's actuators, regardless of whether they result in an apparent motion of the robot, may be performed with specific timing with respect to each other. The coordinated motion of the robot referred to herein describes a coordinated control effort that involves movement and/or actuation of one or more limbs and/or robotic mechanisms of the robot, which may serve to accomplish a particular task or goal.

In some instances, a coordinated motion may assist in achieving a particular goal. For example, a legged robot may be configured with a manipulator arm capable of picking up objects. In an example scenario, the legged robot may be tasked with clearing rubble from a collapsed building and is thus instructed to pick up objects and throw them a safe distance away from the rubble. In this example, solely operating the manipulator arm to toss the object while leaving the legs stationary may produce suboptimal results, with the objects only traveling a short distance. However, a coordinated motion may involve operating the robot's legs in order to introduce inertia that increases the objects' momentum. Coupling the robot's leg motion with a swinging of the manipulator arm may cause an object to travel a much farther distance compared to throwing the object using only the manipulator arm. As a result, a coordinated motion may provide a more desirable result for a legged robot assisting in a rescue operation by enabling the robot to move heavier objects and throw them a safe distance away from the rubble.

As another example, a legged robot, such as a quadruped robot, may encounter a tall step that it is ordinarily incapable of scaling using a standard walking behavior (due to strength limitations of the quadruped robot's legs, for example). The steady-state walking behavior may involve lifting the legs from underneath the robot's body and placing them in a forward position to move the body forward. However, when coming across a tall step, a coordinated motion may be utilized in order to ascend the step. By operating the front legs into a bent position, then exerting a large force against the ground, the robot's front feet may be propelled upwards and onto the tall step. Then, in a similar manner, the robot's hind legs may "hop" up onto the step, at which point the robot may continue its steady-state walking behavior.

In order to determine the feed-forward control inputs that cause the control system to operate the robot with a coordinated motion, a computing system may perform simulations to identify a feasible set or sets of control parameters that achieve a certain desired motion or a predetermined goal. In the object-throwing example described above, the predetermined goal may be to maximize the distance that the object is thrown (or throw the object to at least a certain threshold distance). In the step-climbing example describe above, the desired motion includes a "hopping" motion that propels the robot's feet to the height of the step. In both of these examples, a predetermined objective is known, and simulations may be performed to determine which combination or combinations of control parameters may be provided to the robot's control system in order to either achieve the desired goal or approach a desired quantitatively measurable result.

In some implementations, a computing system may store a model of the robot. The model is a digital representation of the robot that describes the relationship between external forces applied to the robot, inputs to the robot's control system, and the robot's kinematics and the resulting movement of the robot. The model may include information about the robot that affects the kinematic motion of the robot, such as the weight, size, and shape of various components, among other information. The robot model may also include a model of the robot's control system, and may be configured to receive feed-forward control inputs in a similar manner to the actual control system of the robot. In addition to the robot model, the computing system may also include various physics models and models of other objects, depending on the desired task being simulated. Thus, the computing system may be capable of simulating the robot's motion over time within a certain environment given a particular set of control parameters.

The computing system may be configured to store information associated with the simulations. For instance, referring to the object-throwing example above, the computing system may store the positions of various components of the robot over time during the motion, forces exerted by the actuators during the motion, torques produced by certain portions of the robot during the motion, and the position of the object during and after the motion, among other measurable aspects of the simulation results. From the stored information, the computing system may identify salient characteristics of the simulation results, such as peak torque and power exerted by the robot's actuators, the smallest and largest angles of the joints, and the net distance the object was thrown, among other characteristics.

The computing system may further be configured to assign a score to each of the simulation results based on the identified characteristics from the simulation. The scoring may involve weighing (i) how close the simulated motion was to achieving the predetermined goal, against (ii) any constraints that were violated. In some implementations, one or more sub-scores may be determined corresponding to the goal, and one or more sub-scores may also be determined corresponding to the constraints. The computing system may calculate a score as a linear combination of the determined sub-scores, for example. The resulting score numerically represents both the effectiveness of the control parameters in achieving the predetermined goal and the extent to which constraints were exceeded.

In some instances, a set of scores corresponding to a given set of simulation results may not produce a desirable score. In these instances, the computing system may analyze the variations between the control parameters and identify a pattern that produces better scores. The pattern may identify a manner of varying the control parameters that results in a more desired score. The computing system may utilize this pattern in selecting different sets of control parameters, which are then simulated and scored in the manner described above. This process of pattern identification, simulation, and scoring may be performed iteratively a predetermined number of times, until the variance in scores fall below a certain threshold variance, until a desired score is reached for at least one set of control parameters, or until all of the constraints are satisfied.

The computing system may then compare the determined scores to select a particular set of control parameters corresponding to a desired score. Depending on the particular implementation, the desired score is the score having either the largest value or the smallest value. For instance, certain implementations may determine scores from simulation results that approach the predetermined goal to be low and penalize simulation results that violate the robot's constraints by increasing the score value. In this case, a lower score corresponds to a simulation result that better achieves the predetermined goal while complying with the robot's constraints, relative to the other scores. In other implementations, a desired score may be a particular value, and the desired score is the score among the determined scores that is closest in value to the particular value. For example, it may be desired for certain implementations to determine feed-forward control inputs that produce a coordinated motion that satisfactorily accomplishes the goal. In these cases, determining feed-forward control inputs that produce a certain score that, while not minimized or approaching a minimum, is at or around a particular score may suffice.

The computing system may then provide the selected set of control parameters to the robot. The control system may receive the control parameters as feed-forward control inputs, which in turn modifies the robot's behavior to execute the motion corresponding to the selected set of control parameters.

In some implementations, the robot includes a network interface that can receive the control parameters wirelessly. In some cases, the computing system may determine a set of feed-forward control parameters using operations of the present application. These control parameters are then transmitted wirelessly to the robot's network interface to modify its behavior and cause it to execute a coordinated motion corresponding to those control parameters.

In some cases, the computing system may comprise many computing devices connected over a wide area network (e.g. a cloud computing platform). The robot's network interface may connect to this wide area network and receive control parameters therefrom.

A robot utilizing a coordinated motion may be able to accomplish tasks that ordinarily would be difficult or require specifically designed robots for each specialized task. By computationally determining those feed-forward control inputs, such a robot may be able to assist in a variety of tasks that might otherwise require specialized robots or human intervention. For instance, an object-throwing robot employing coordinated motion may assist in search and rescue operations by clearing rubble and displacing it a safe distance from unstable areas. As another example, a robot capable of scaling tall steps may be able to provide supplies to remote locations for individuals in need thereof. Such a robot may be able to accomplish tasks that otherwise would present a danger to human beings.

II. Example Robotic Systems

Referring now to the figures, FIG. 1 illustrates an example configuration of a robotic device, according to an example implementation. The robotic system 100 represents an example robotic device configured to perform the operations described herein. Additionally, the robotic device 100 may be configured to operate autonomously, semi-autonomously, and/or using directions provided by user(s), and may exist in various forms, such as a humanoid robot, a quadruped robot, or a wheeled robot, among other examples. Furthermore, the robotic device 100 may also be referred to as a robotic device, mobile robot, or robot, among other designations.

As shown in FIG. 1, the robotic device 100 includes processor(s) 102, data storage 104, program instructions 106, controller 108, sensor(s) 110, power source(s) 112, mechanical components 114, electrical components 116, and communication link(s) 118. Note that the robotic device 100 is shown for illustration purposes and may include more or less components without departing from the scope of the disclosure herein. The various components of robotic device 100 may be connected in any manner, including wired or wireless connections, etc. Further, in some examples, components of the robotic device 100 may be positioned on multiple distinct physical entities rather on a single physical entity. Other example illustrations of robotic device 100 may exist as well.

Processor(s) 102 may operate as one or more general-purpose processors or special purpose processors (e.g., digital signal processors, application specific integrated circuits, etc.). The processor(s) 102 can be configured to execute computer-readable program instructions 106 that are stored in the data storage 104 and are executable to provide the operations of the robotic device 100 described herein. For instance, the program instructions 106 may be executable to provide operations of controller 108, where the controller 108 may be configured to cause activation and deactivation of the mechanical components 114 and the electrical components 116. The processor(s) 102 may operate and enable the robotic device 100 to perform various operations, including the operations described herein.

The data storage 104 may exist as various types of storage media, such as a memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic device 100 may include at least one controller 108, which may interface with the robotic device 100. The controller 108 may serve as a link between portions of the robotic device 100, such as a link between mechanical components 114 and/or electrical components 116. In some instances, the controller 108 may serve as an interface between the robotic device 100 and another computing device. Further, the controller 108 may serve as an interface between the robotic system 100 and a user(s). The controller 108 may include various components for communicating with the robotic device 100, including a joystick(s), buttons, among others. The controller 108 may perform other operations for the robotic device 100 as well. Other examples of controllers may exist.

Additionally, the robotic device 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment as well as monitoring of operation of the systems of the robotic device 100. The sensor data may be used in evaluation of various factors for activation and deactivation of mechanical components 114 and electrical components 116 by controller 108 and/or a computing system of the robotic device 100 (e.g. processor(s) 102 and data storage 104).

The sensor(s) 110 may provide information indicative of the environment of the robotic device for the controller 108 and/or computing system to use to determine operations for the robotic device 100. For example, the sensor(s) 110 may capture data corresponding to the terrain of the environment or location of nearby objects, which may assist with environment recognition and navigation, etc. In an example configuration, the robotic device 100 may include a sensor system that may include a camera, RADAR, LIDAR, a global positioning system (GPS) transceiver, and/or other sensors for capturing information of the environment of the robotic device 100. In addition, the sensor(s) may include one or more inertial measurement units (IMUs) mounted on various portions on the robotic device 100 that may measure the position, velocity, acceleration, and/or orientation of a particular portion of the robotic device 100. Further, the sensor(s) 110 may include rotary position sensors, such as rotary encoders or optical reflection devices, for detecting changes in the angles of the joints of the robotic device 100. The sensor(s) 110 may monitor the environment in real-time or periodically and detect obstacles, elements of the terrain, weather conditions, temperature, and/or other parameters of the environment for the robotic device 100.

Further, the robotic device 100 may include other sensor(s) 110 configured to receive information indicative of the state of the robotic device 100, including sensor(s) 110 that may monitor the state of the various components of the robotic device 100. The sensor(s) 110 may measure activity of systems of the robotic device 100 and receive information based on the operation of the various features of the robotic device 100, such the operation of extendable legs, arms, or other mechanical and/or electrical features of the robotic device 100. The sensor data provided by the sensors may enable the computing system of the robotic device 100 to determine errors in operation as well as monitor overall functioning of components of the robotic device 100.

For example, the computing system may use sensor data to determine the stability of the robotic device 100 during operations as well as measurements related to power levels, communication activities, components that require repair, among other information. As an example configuration, the robotic device 100 may include gyroscope(s), accelerometer(s), and/or other possible sensors to provide sensor data relating to the state of operation of the robotic device. Further, sensor(s) 110 may also monitor the current state of an operation, such as a gait, that the robotic system 100 may currently be performing. Additionally, the sensor(s) 110 may measure a distance between a given robotic leg of a robotic device and a center of mass of the robotic device. Other example uses for the sensor(s) 110 may exist as well.

Additionally, the robotic device 100 may also include one or more power source(s) 112 configured to supply power to various components of the robotic device 100. Among possible power systems, the robotic device 100 may include a hydraulic system, electrical system, batteries, and/or other types of power systems. As an example illustration, the robotic device 100 may include one or more batteries configured to provide power to components via a wired and/or wireless connection. Within examples, components of the mechanical components 114 and electrical components 116 may each connect to a different power source or may be powered by the same power source. In various implementations, mechanical components 114 may be powered by one or more mechanical power sources, such as turbines, engines, motors, and/or other mechanical power plants. Electrical components 116 may be powered by one or more electrical power sources, such as batteries, solar panels, thermoelectric converters, fuel cells, and/or piezoelectric generators. In addition, mechanical power may be transformed into electrical power using, for example, a motor or a turbine. Components of the robotic system 100 may connect to multiple power sources as well.

Any type of power source may be used to power the robotic device 100, such as a gasoline engine or batteries. Further, the power source(s) 112 may charge using various types of charging, such as wired connections to an outside power source, wireless charging, combustion, or other examples. Other configurations may also be possible. Additionally, the robotic device 100 may include a hydraulic system configured to provide power to the mechanical components 114 using fluid power. Components of the robotic device 100 may operate based on hydraulic fluid being transmitted throughout the hydraulic system to various hydraulic motors and hydraulic cylinders, for example. The hydraulic system of the robotic device 100 may transfer power through small tubes, flexible hoses, or other links between components of the robotic device 100. Other power sources may be included within the robotic device 100.

Mechanical components 114 represent hardware of the robotic system 100 that may enable the robotic device 100 to operate and perform physical functions. As a few examples, the robotic device 100 may include actuator(s), extendable leg(s) ("legs"), arm(s), wheel(s), one or multiple structured bodies for housing the computing system or other components, as well as other mechanical components. The mechanical components 114 may depend on the design of the robotic device 100 and may also be based on the functions and/or tasks the robotic device 100 may be configured to perform. As such, depending on the operation and functions of the robotic device 100, different mechanical components 114 may be available for the robotic device 100 to utilize. In some examples, the robotic device 100 may be configured to add and/or remove mechanical components 114, which may involve assistance from a user and/or other robotic device. For example, the robotic device 100 may be initially configured with four legs, but may altered by a user or the robotic device 100 to remove two of the four legs to operate as a biped. Other examples of mechanical components 114 may be included.

The electrical components 116 may include various components capable of processing, transferring, and/or providing electrical charge or electric signals, for example. Among possible examples, the electrical components 116 may include electrical wires, circuitry, and/or wireless communication transmitters and receivers to enable operations of the robotic device 100. The electrical components 116 may interwork with the mechanical components 114 to enable the robotic device 100 to perform various operations. The electrical components 116 may be configured to provide power from the power source(s) 112 to the various mechanical components 114, for example. Further, the robotic device 100 may include electric motors. Other examples of electrical components 116 may exist as well.

In some implementations, the robotic device 100 may also include communication link(s) 118 configured to send and/or receive information. The communication link(s) 118 may transmit data indicating the state of the various components of the robotic device 100. For example, information read in by sensor(s) 110 may be transmitted via the communication link(s) 118 to a separate device. Other diagnostic information indicating the integrity or health of the power source(s) 112, mechanical components 114, electrical components 118, processor(s) 102, data storage 104, and/or controller 108 may be transmitted via the communication link(s) 118 to an external communication device.

In some implementations, the robotic device 100 may receive information at the communication link(s) 118 that is processed by the processor(s) 102. The received information may indicate data that is accessible by the processor(s) 102 during execution of the program instructions 106, for example. Further, the received information may change aspects of the controller 108 that may affect the behavior of the mechanical components 114 or the electrical components 116. In some cases, the received information indicates a query requesting a particular piece of information (e.g. the operational state of one or more of the components of the robotic device 100), and the processor(s) 102 may subsequently transmit that particular piece of information back out the communication link(s) 118. In other cases, the received information may include feed-forward control inputs that influence the feedback controller to cause the robotic device 100 to perform a coordinated motion.

In some cases, the communication link(s) 118 include a wired connection. The robotic device 100 may include one or more communication ports to interface the communication link(s) 118 to an external device. The communication link(s) 118 may include, in addition to or alternatively to the wired connection, a wireless connection. Some example wireless connections may utilize a cellular connection, such as CDMA, EVDO, GSM/GPRS, or 4G telecommunication protocols, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) protocol.

Figure 2:
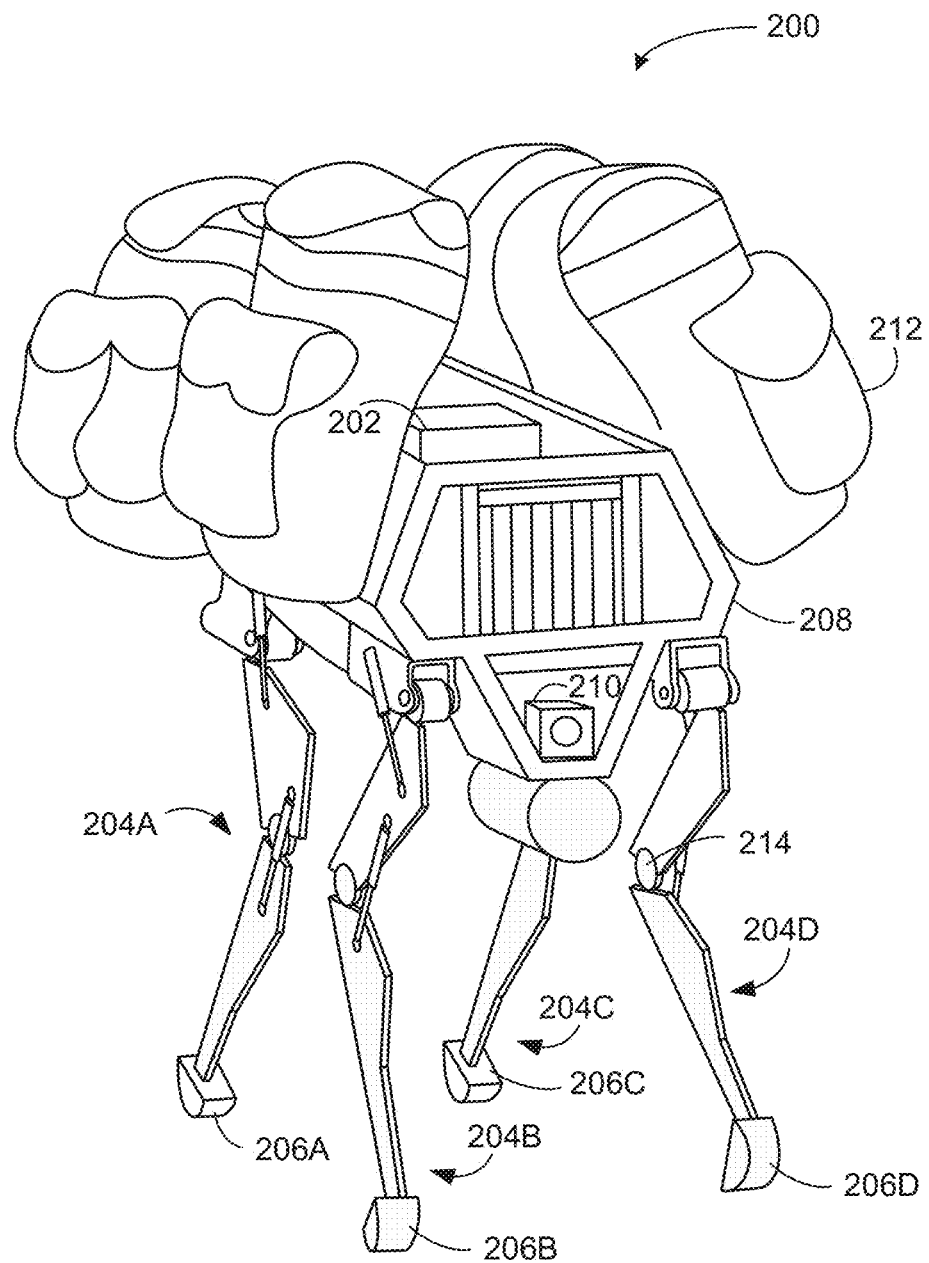
FIG. 2 illustrates a perspective view a quadruped robot, according to an example implementation.

FIG. 2 illustrates a perspective view of an example quadruped robot, according to an example implementation. The robotic device 200 may be configured to perform the procedures described herein during operation. The robotic device 200 includes legs 204A, 204B, 204C, and 204D connected to a body 208 of the robotic device 200 and may also include sensors configured to provide sensor data to a computing system of the robotic device 200. Each leg 204A, 204B, 204C, and 204D may include feet 206A, 206B, 206C, and 206D, respectively. Sensors may be incorporated within portions of the legs 204A, 204B, 204C, and 204D to detect pressure, position, velocity, acceleration, and orientation of these legs, respectively, among other measurements. Other sensors, such as sensor(s) 210, may be placed on the body of the robotic device 200 to measure, for example, the robotic device's orientation, position, velocity, and acceleration. Further, the robotic device 200 is illustrated carrying objects 212 on the body 208. Within other example implementations, the robotic device 200 may include more or fewer components and may additionally include components not shown in FIG. 2.

The robotic device 200 may be a physical representation of the robotic system 100 shown in FIG. 1 or may be based on other configurations. To operate, the robotic device 200 includes a computing system that be made up of one or multiple computing devices configured to assist in various operations of the robotic device 200. These operations may include processing data and providing outputs based on the data to cause various changes to the physical state of the robotic device 200. The computing system may process information provided by various systems of the robotic device 200 (e.g., a sensor system) or from other sources (e.g., a user, another robotic device, a server) and may provide instructions to these systems to operate in response.

Additionally, the computing system may monitor systems of the robotic device 200 during operation, which may include monitoring for errors and/or monitoring regular operation, for example. In some example configurations, the computing system may serve as a connection between the various systems of the robotic device 200, and may coordinate the operations of the systems together to enable the robotic device 200 to perform operations. Further, the computing system may include multiple devices, processors, controllers, and/or other entities configured to control or assist in the operation of the robotic device. Additionally, the computing system may operate using various types of memory and/or other components.

The robotic device 200 exists as a quadruped robotic device with four extendable legs 204A, 204B, 204C, and 204D. Although the robotic device 200 includes four legs 204A, 204B, 204C, and 204D in the illustration shown in FIG. 2, the robotic device 200 may include more or less legs within other examples. Further, the configuration, position, and/or structure of the legs 204A, 204B, 204C, and 204D may vary in example implementations. The legs 204A, 204B, 204C, and 204D enable the robotic device 200 to move, and may be configured to operate in multiple degrees of freedom to enable different techniques of travel to be performed. In particular, the legs 204A, 204B, 204C, and 204D may enable the robotic device 200 to travel at various speeds through mechanically controlling the legs 204A, 204B, 204C, and 204D.

Each robotic leg 204A, 204B, 204C, and 204D may include joints, such at joint 214, and actuators. The joints allow members of a robotic leg to move through a range of angles in a number of degrees of freedom. During operation, an actuator may be extended or compressed in order facilitate moving a robotic leg to various positions. Certain joints may have limited ranges of motion (e.g. 90 degrees to 180 degrees). Some combinations of joints and members may allow a robotic leg to move its lateral position, longitudinal position, and/or vertical position.

Additionally, the actuators may include physical limitations that indicate constraints within which the actuators may operate. For example, a given actuator may have a maximum instantaneous force and a maximum sustained force that it is capable of exerting. In some cases, the control system of the robotic device 200 may be configured to prevent overexertion of the actuators in order to prevent them from becoming damaged. The actuators may also include other physical specifications, such as a maximum change in force over a given period of time, that constrain its operation. In some instances, the constraints within which the actuators are bound may be below the limitations of the actuators physical capabilities. In these instances, the constraints may be intentionally lower than the physical limitations in order to provide more safe and reliable operation of the actuator.

A gait is a pattern of movement of the limbs of animal, robotic device, or other mechanical structure. As such, the robotic device 200 may navigate by operating the legs 204A, 204B, 204C, and 204D to perform various gaits. The robotic device 200 may use a variety gaits to travel within an environment, which may involve selecting a gait based on speed, terrain, the need to maneuver, and/or energy efficiency. The robotic device 200 may be configured to dynamically switch between gaits, which may enable the robotic device to change speeds or the mechanics of operating the legs 204A, 204B, 204C, and 204D.

Further, different types of robotic devices may use different gaits due to differences in design (e.g. the number of legs of the robotic device) that may prevent use of certain gaits. Although some gaits may have specific names (e.g., walk, trot, run, gallop, and bound), the distinctions between these gaits may be slight. The gaits may be classified based on footfall patterns, the patterns including locations on a surface for the placement of distal ends of the extendable legs (e.g., feet). Similarly, gaits may also be classified based on mechanics.

Additionally, the robotic device 200 may include other mechanical apertures or appendages, which may be attached to the robotic device 200 at various positions. The robotic device 200 may include mechanical arms, grippers, wheels, or other features. The legs 204A, 204B, 204C, and 204D may have feet or other types of mechanical features (e.g. rubber feet to increase friction between the robotic device and a surface) that enables control upon various types of surfaces that the robotic device may encounter.

As part of the design of the example robotic device 200, the body 208 of the robotic device 200 connects to the legs 204A, 204B, 204C, and 204D and may house various components of the robotic device 200. As such, the structure of the body 208 may vary within examples and may further depend on particular operations that a given robotic device may have been designed to perform. For example, a robotic device developed to carry heavy loads may have a wide body that enables placement of the loads. Similarly, a robotic device designed to reach high speeds may have a narrow, small body that does not have substantial weight. Further, the body 208 as well as the legs 204A, 204B, 204C, and 204D may be developed using various types of materials, such as various metals or plastics. Within other examples, a robotic device may have a body with a different structure or made of other types of materials.

The sensor(s) 210 of the robotic device 200 may include various types of sensors. The sensor(s) 210 may be placed at various positions on the robotic device. As described for the robotic system 100, the robotic device 200 may include a sensory system that includes a camera, RADAR, LIDAR, a GPS transceiver, accelerometer(s), gyroscope(s), and/or other types of sensors. The sensor(s) may be configured to measure parameters of the environment of the robotic device 200 as well as monitor internal operations of systems of the robotic device 200. In some examples, the robotic device 200 may include sensors to measure the orientation, position, velocity, or acceleration of each leg 204A, 204B, 204C, and 204D.

In some implementations, sensor(s) 210 may be coupled to portions of the robotic legs 204A, 204B, 204C, and 204D. For instance, sensors may be configured to measure the angles of the joints of the robotic legs 204A, 204B, 204C, and 204D. In some implementations, the information or data output by the sensors may be provided to the control system 202. In some instances, inertial measurement units (IMUs) may be mounted to sections of the robotic legs 204A, 204B, 204C, and 204D in order to determine the orientation of each member the robotic legs 204A, 204B, 204C, and 204D. In addition, sensors, such as pressure transducers, may be coupled to the actuators of the robotic legs 204A, 204B, 204C, and 204D to measure the pressure inside the actuators and/or to measure the length that the actuator is extended or compressed. Other sensors may be included in addition to the previously mentioned sensors in order to measure aspects of the robotic device 200 from which angles of the joints of the robotic legs 204A, 204B, 204C, and 204D can be calculated.

In some implementations, the actuators of the robotic legs 204A, 204B, 204C, and 204D may be controlled to apply varying amounts of force. In some scenarios, a control system may control a particular robotic leg to apply a greater or lesser extent of force. Additionally, an amount of force being applied by a given robotic leg may be measured using sensors coupled to the robotic leg, such as a force sensor or a load cell.

The loads 212 carried by the robotic device 200 may represent various types of cargo that the robotic device 200 may transport. The loads 212 may also represent external batteries or other types of power sources (e.g., solar panels) that the robotic device 200 may utilize.

Additionally, as shown with the robotic device 100, the robotic device 200 may also include various electrical components that may enable operation and communication between the mechanical features of the robotic device 200. As previously indicated, the robotic device 200 may include one or more computing systems that include one or multiple processors configured to perform various operations, including processing inputs to provide outputs. The computing system may include additional components, such as various types of storage and a power source, etc.

Control system 202 of robotic device 200 may cause the robotic device 200 to navigate an environment based on sensor data from the sensing system. The sensing system may include sensors of sensing system coupled to portions of the robotic device 200. The robotic device 200 may receive navigation commands by way of a communication system. For instance, the robotic device may receive a command to move forward at 5 kilometers per hour. The command may specify to walk forward for a particular distance, such as 100 meters. In an example, a command may specify one or more locations at which to place particular legs.

Control system 202 of the robotic device 200 may also be configured to receive feed-forward control inputs that cause the robotic device to perform a transient motion. In some cases, the feed-forward control inputs include timing parameters that allow for a synchronous execution of a coordinated motion. The control system 202 may be configured with feed-forward and feedback mechanisms, where the feedback mechanisms maintain the robotic device's cyclic or steady-state behavior, and the feed-forward mechanisms allow for execution of a transient behavior. In some implementations, the control system is configured to perform a steady-state or cyclic behavior, perform a transient behavior responsive to receiving feed-forward control inputs, then return back to the steady-state or cyclic behavior upon conclusion of the transient operation.

In some examples, the navigation commands may involve GPS coordinates. In some instances, a command may instruct the robotic device to navigate to a particular position, which may be defined by particular GPS coordinates. The robotic device may then cause the locomotion system to move to the position while navigating physical features of the terrain identified by the control system (perhaps based on data from perception sensors). Another command may instruct the robotic device to follow a particular person, who may have with them a GPS enabled device that generates data indicating the position of the person. The data may be communicated to the robotic device that may then cause the locomotion system to follow the person while navigating physical features of the terrain identified by the control system.

In some example implementations, during operation, the computing system may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait in a given direction. The computing system may process the input, and may cause the systems of the robotic device to perform the requested gait. Additionally, the robotic device's electrical components may include other type of electrical components, including but not limited to interface, wires, busses, and/or other communication links configured to enable systems of the robotic device to communicate.

Furthermore, the robotic device 200 may communicate with one or multiple users and/or other robotic devices via various types of interfaces. In an example implementation, the robotic device 200 may receive input from a user via a joystick or similar type of interface. The computing system may be configured to receive data indicative of the amount of force, the duration of force applied to the joystick, and other possible information, from a joystick interface. Similarly, the robotic device 200 may receive inputs and communicate with a user via other types of interface, such as a mobile device or a microphone. Regardless, the computing system of the robotic device 200 may be configured to process the various types of inputs that the robotic device 200 may receive.

Figure 3:
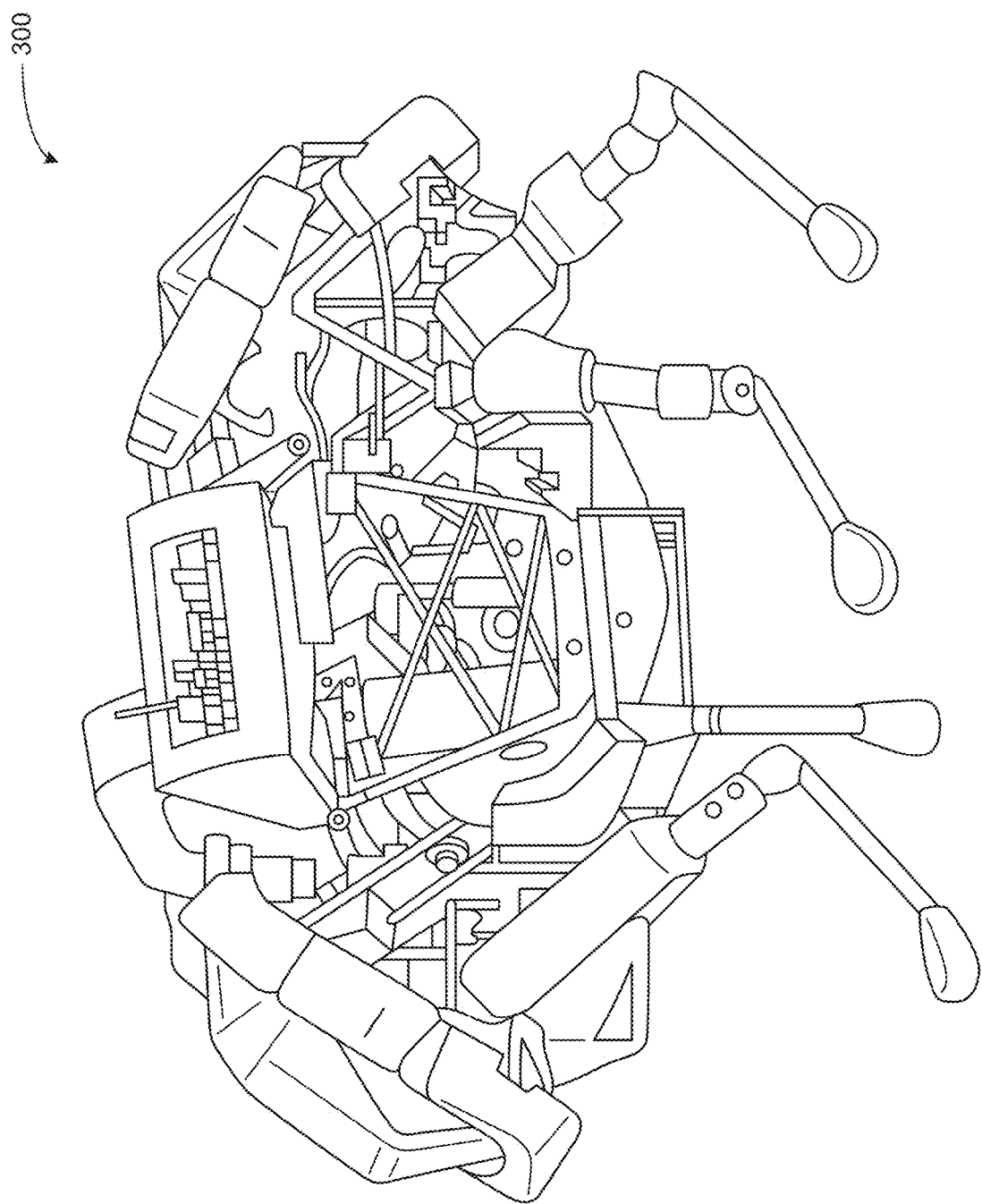
FIG. 3 illustrates a perspective view a quadruped robot, according to an example implementation.

FIG. 3 illustrates another example quadruped robot, according to an example implementation. Similarly to robotic device 200 shown in FIG. 2, the robotic device 300 may correspond to the robotic system 100 shown in FIG. 1. The robotic device 300 serves as another possible implementation of a robotic device that may be configured to receive feed-forward control inputs for performing coordinated motion. Other example implementations of robotic devices may exist.

Figure 4:
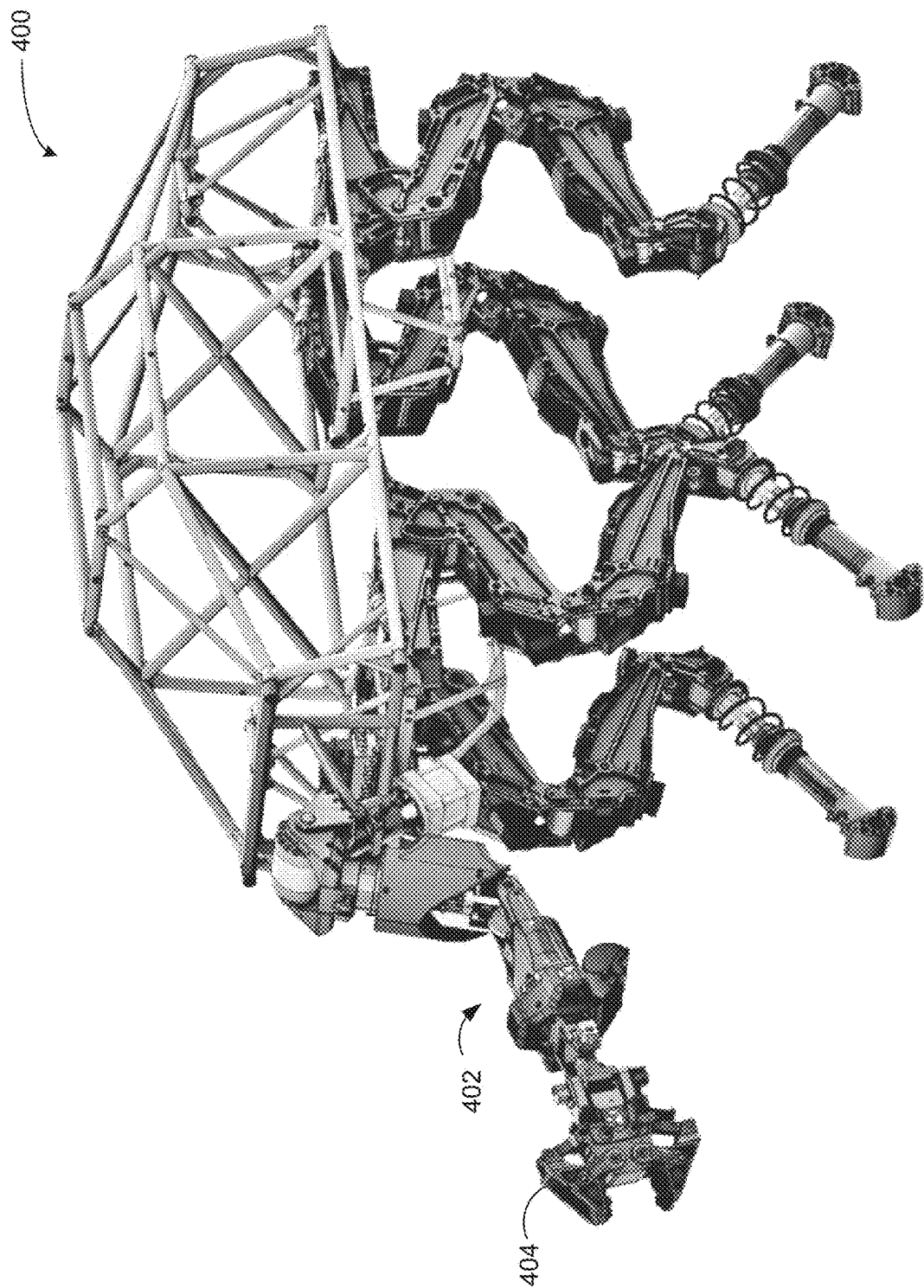
FIG. 4 illustrates a perspective view a biped robot, according to an example implementation.

FIG. 4 illustrates an example of a quadruped robot according to another example implementation. Similarly to the robotic device 200 shown in FIG. 2, the robotic device 400 may correspond to the robotic system 100 shown in FIG. 1. The robotic device 400 serves as a possible implementation of a robotic device that may be configured to receive feed-forward control inputs for performing coordinated motion. Other example implementations of robotic devices may exist.

The robotic device 400 includes a manipulator arm 402. The manipulator arm 402 may include a number of joints and actuators that allow the manipulator arm 402 to operate within a number of degrees of freedom (e.g. 2-8 degrees of freedom). The manipulator arm 402 may also include an end effector 404 that allows the robotic device 400 to interact with objects. The end effector 404 may be able to clamp onto objects and grip them, allowing it to move objects about. In some cases, the operation of the end effector 404 may be coordinated with operation of the manipulator arm 402 and other robotic mechanisms of the robotic device 400 in order to throw objects within its grasp. The manipulator arm 402 may be configured to perform other operations as well.

Figure 5:
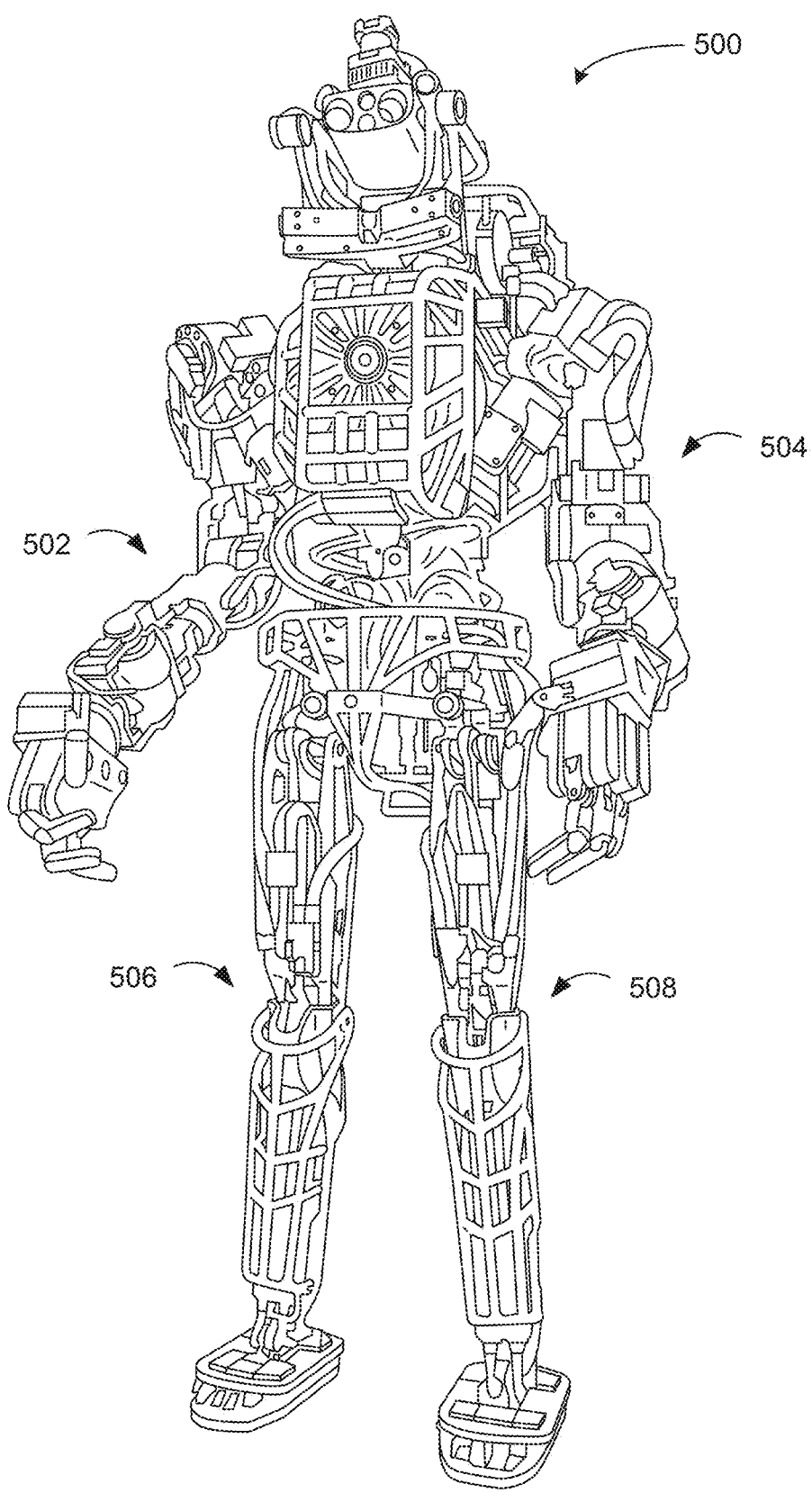
FIG. 5 illustrates a perspective view a quadruped robot with a manipulator arm, according to an example implementation.

FIG. 5 illustrates an example of a biped robot according to another example implementation. Similar to the robotic device 200 shown in FIG. 2, the robotic device 500 may correspond to the robotic system 100 shown in FIG. 1. The robotic device 500 serves as a possible implementation of a robotic device that may be configured to receive feed-forward control inputs for performing coordinated motion. Other example implementations of biped robotic devices may exist.

The robotic device 500 may include a number of articulated appendages, such as robotic arm 502, robotic arm 504, robotic leg 506, and/or robotic leg 508. Each articulated appendage may include a number of members connected by joints that allow the articulated appendage to move through certain degrees of freedom. Each member of an articulated appendage may have properties describing aspects of the member, such as its weight, weight distribution, length, and/or shape, among other properties. Similarly, each joint connecting the members of an articulated appendage may have known properties, such as the degrees of its range of motion the joint allows, the size of the joint, and the distance between members connected by the joint, among other properties. A given joint may be a joint allowing one degree of freedom (e.g. a knuckle joint or a hinge joint), a joint allowing two degrees of freedom (e.g. a cylindrical joint), a joint allowing three degrees of freedom (e.g. a ball and socket joint), or a joint allowing four or more degrees of freedom. A degree of freedom may refer to the ability of a member connected to a joint to move about a particular translational or rotational axis.

The robotic device 500 may be configured to send sensor data from the articulated appendages to a device coupled to the robotic device 500, such as a processing system, a computing system, or a control system. The robotic device 500 may include a memory, either included in a device on the robotic device 500 or as a standalone component, on which sensor data is stored. In some implementations, the sensor data is retained in the memory for a certain amount of time. In some cases, the stored sensor data may be processed or otherwise transformed for use by a control system on the robotic device 500. In some cases, the robotic device 500 may also transmit the sensor data over a wired or wireless connection to an external device.

III. Example Scenarios

The following scenarios described in FIG. 6A, FIG. 6B, FIG. 7A, and FIG. 7B are provided for explanatory reasons. The operations and control schema described herein may be applied to a variety of other scenarios in which a coordinated motion is utilized in order to achieve a goal. A goal of the simulated motion is accomplished when at least one measurable aspect of the simulated motion meets or exceeds a desired result. Robots having any number of appendages may have a control system configured to receive feed-forward control inputs that induce coordinated motion. The following descriptions are merely examples in which operations described herein may be used to facilitate coordinated motion on a robot.

Figure 6A:
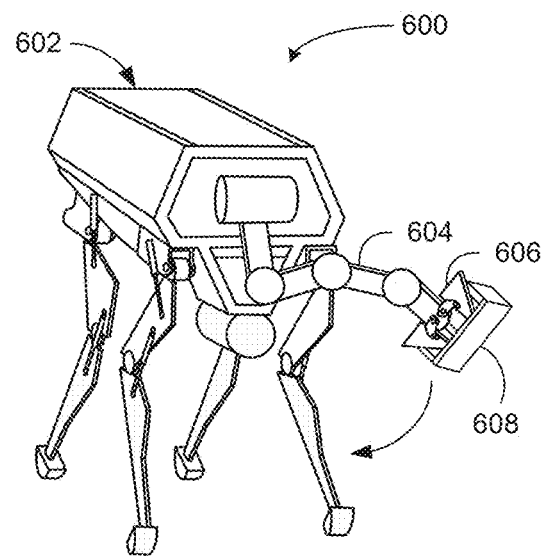
FIG. 6A illustrates a first state of a quadruped robot with a manipulator arm throwing an object, according to an example implementation.

FIG. 6A illustrates a first state 600 of a quadruped robot 602 with a manipulator arm throwing an object, according to an example implementation. The quadruped robot 602 may be similar to robotic device 400, and may include a control system configured to receive feed-forward control inputs. As shown in FIG. 6A, the quadruped robot 602 includes four robotic legs and a manipulator arm 604. The manipulator arm 604 may include any number of joints controlled by actuators that operate movement of the manipulator arm 604. The manipulator arm 604 includes an end effector 606 capable of gripping objects, such as brick 608 depicted in FIG. 6A. Note that the quadruped robot 602 is one example robot that may be used to throw an object; robots having a different combination of legs, manipulator arms, joints, and actuators may also be utilized for throwing objects.

Figure 6B:
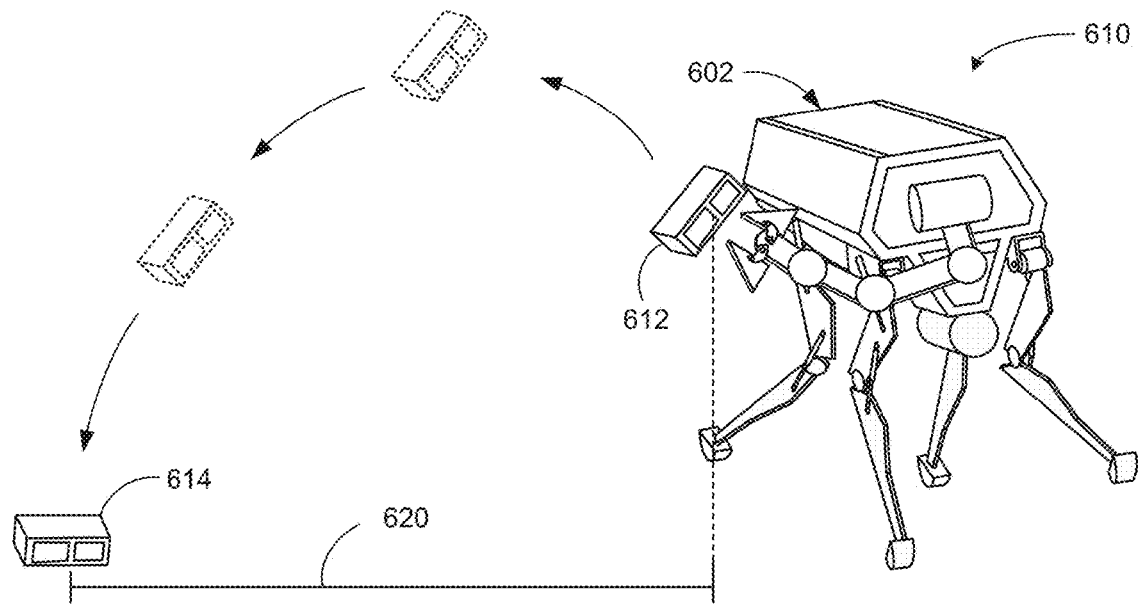
FIG. 6B illustrates a second state of a quadruped robot with a manipulator arm throwing an object, according to an example implementation.

In FIG. 6A and FIG. 6B, a computing device has previously determined or obtained feed-forward control inputs using operations described in the "Overview" section above. The operations involved in determining feed-forward control inputs is described in more detail below in the "Example Operations" section. The feed-forward control inputs (which may also be referred to herein as "a set of control parameters") may include multiple subsets of control parameters. Each subset may correspond to particular joint angles and/or actuator forces in a particular leg of the quadruped robot 602. In addition, the feed-forward control inputs may indicate one or more states of the quadruped robot 602—where each state is associated with a particular set of joint angles and/or actuator forces—and timing parameters that indicate a durations of motion for transitioning between each state.

In the example scenario depicted in FIG. 6A and FIG. 6B, the quadruped robot 602 has been provided feed-forward control parameters that cause the quadruped robot 602 to move its manipulator arm 604. The manipulator arm 604 is initially holding a brick at starting position 608. Quadruped robot 602 then swings the brick across its body and releases it at the ending position 612 to throw the brick. The quadruped robot's motion may involve a coordinated compressing and extending of its legs in order to both maintain balance of the quadruped robot 602 and to introduce momentum into the brick by swinging the brick from the starting position 608 to ending position 612.

In FIG. 6A, the quadruped robot 602 is in a first state 600. The first state 600 includes a set of joint angles and/or actuator forces for each of the quadruped robot's legs (which may also be referred to herein as the starting "body pose") and the manipulator arm (which may also be referred to herein as the starting "arm pose"). A control system of quadruped robot 602 may control actuators of quadruped robot 602 to put the quadruped robot 602 in the first state 600 in response to receiving feed-forward control inputs specifying the starting body pose and the starting arm pose. The received feed-forward control inputs may also specify an ending body pose and ending arm pose for the quadruped robot 602, along with a timing parameter that specifies the duration of the motion in transitioning from the starting pose to the ending pose.

FIG. 6B illustrates the quadruped robot 602 in a second state 610. The second state 610 includes the specified ending body pose and ending arm pose. The control system of quadruped robot 602 may operate the robot's actuators to transition from the first state to the second state in response to receiving feed-forward control inputs as described above. The feed-forward control inputs may include timing parameters that allow the control system to coordinate the operation of the actuators in order to synchronize the motion of the quadruped robot 602. In this example, as the quadruped robot 602 swings the brick from position 606 to position 612, the control system may compress and/or extend one or more of the robot's legs in order to leverage the robot's weight in accelerating the brick before releasing it at position 612.

After the quadruped robot 602 releases the brick at position 612, the thrown brick may travel a distance 620 before landing on the ground or another surface at position 614.

The quadruped robot's motion in response to receiving the feed-forward control inputs may be simulated on a computing system. A number of measurable metrics may be obtained from the results of the simulation, such as the extent of force exerted by the robot's actuators over time, the angles at the robot's joints over time, and the distance 620 that the brick travelled. Simulating a robot's motion is described in more detail in the "Example Operations" section below.

Figure 7A:
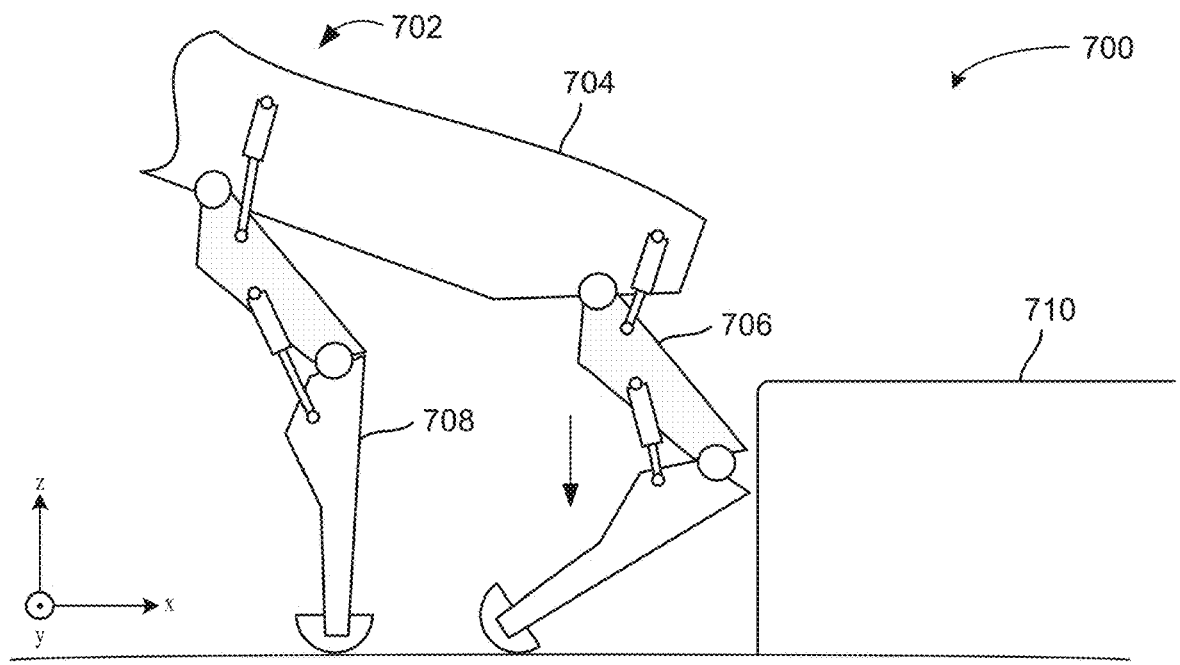
FIG. 7A illustrates a first state of a robot ascending a step, according to an example implementation.

FIG. 7A illustrates a side view of a robot 702 in a first state 700 ascending a step 710, according to an example implementation. The robot 702 may be similar to robotic device 200, and may include a control system configured to receive feed-forward control inputs.

In some instances, an obstacle, such as step 710, may have a height that prohibits robot 702 from stepping onto the obstacle by only a lifting of its legs. In such instances, the robot 702 may utilize a coordinated motion in order to scale the obstacle.

Figure 7B:
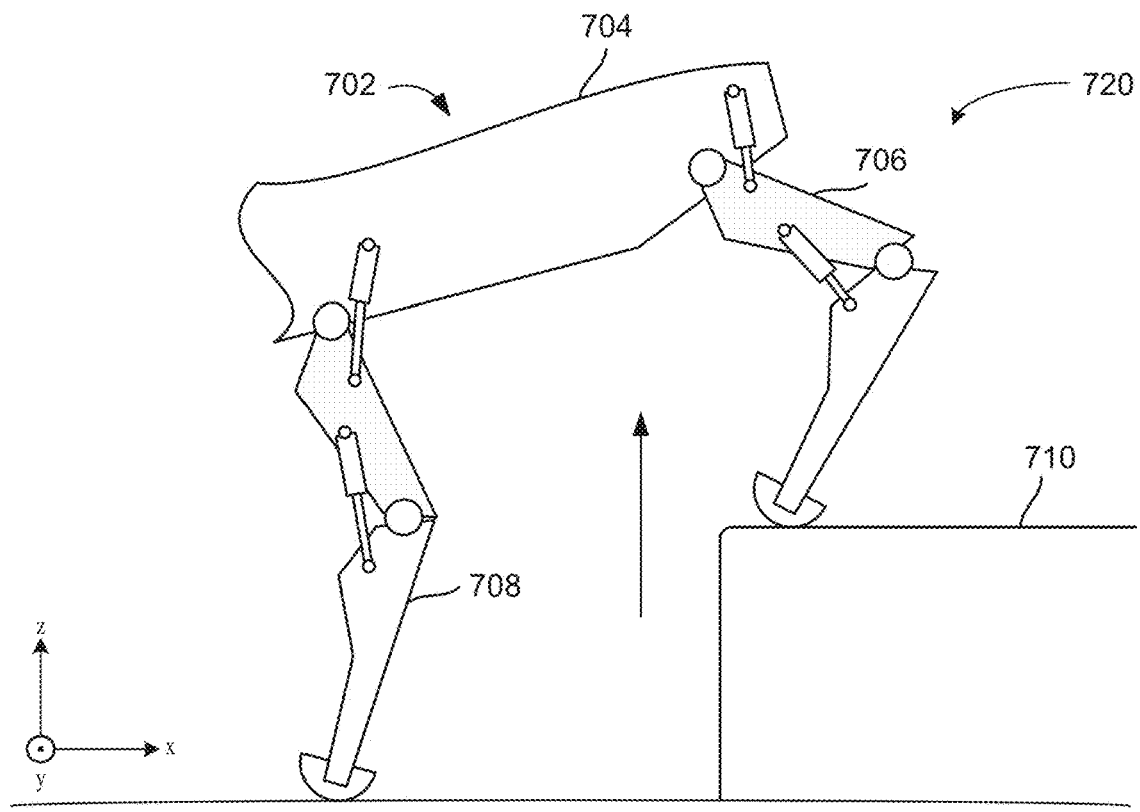
FIG. 7B illustrates a second state of a robot ascending a step, according to an example implementation.

In the example scenario depicted in FIG. 7A and FIG. 7B, the robot 702 compresses its front legs 706 to place itself into the first state, then quickly extends the front legs 706 in order to propel them upwards and onto the step 710 in response to its control system receiving particular feed-forward control inputs. The feed-forward control inputs may also specify a slight compression and extension of the rear legs 708 in order to move the body 704 of the robot 702 forward and allow the front legs 706 to land on step 710.

Similarly to the example depicted in FIG. 6A and FIG. 6B, the robot's motion illustrated in FIG. 7A and FIG. 7B in response to receiving the feed-forward control inputs may be simulated on a computing system.

The preceding examples are two such example scenarios in which operations of the present application may be applied in order to determine feed-forward control inputs that facilitate coordinated motion on a robot. Other example scenarios involving coordinated motion of a robot may exist, and the operations of the present application may be performed in order to determine feasible feed-forward control inputs to be used in accomplishing the coordinated motion.

A "state" referred to herein describes various aspects of a robot's position, orientation, motion, and other information derived therefrom. A state may include, at a particular point in time, the angles of the robot's joints, the velocity of the robot's joints, the position of the robot's actuators, the velocity of the robot's actuators, the force applied by the robot's actuators, the orientation each limb of the robot, the overall velocity of the robot, and the overall orientation of the robot, among other aspects of the robot. In some instances, the joint and actuator constraints of the robot may be derived from one or more recorded states of a robot during its operation and/or from the environment that the robot is in.

Figure 11:
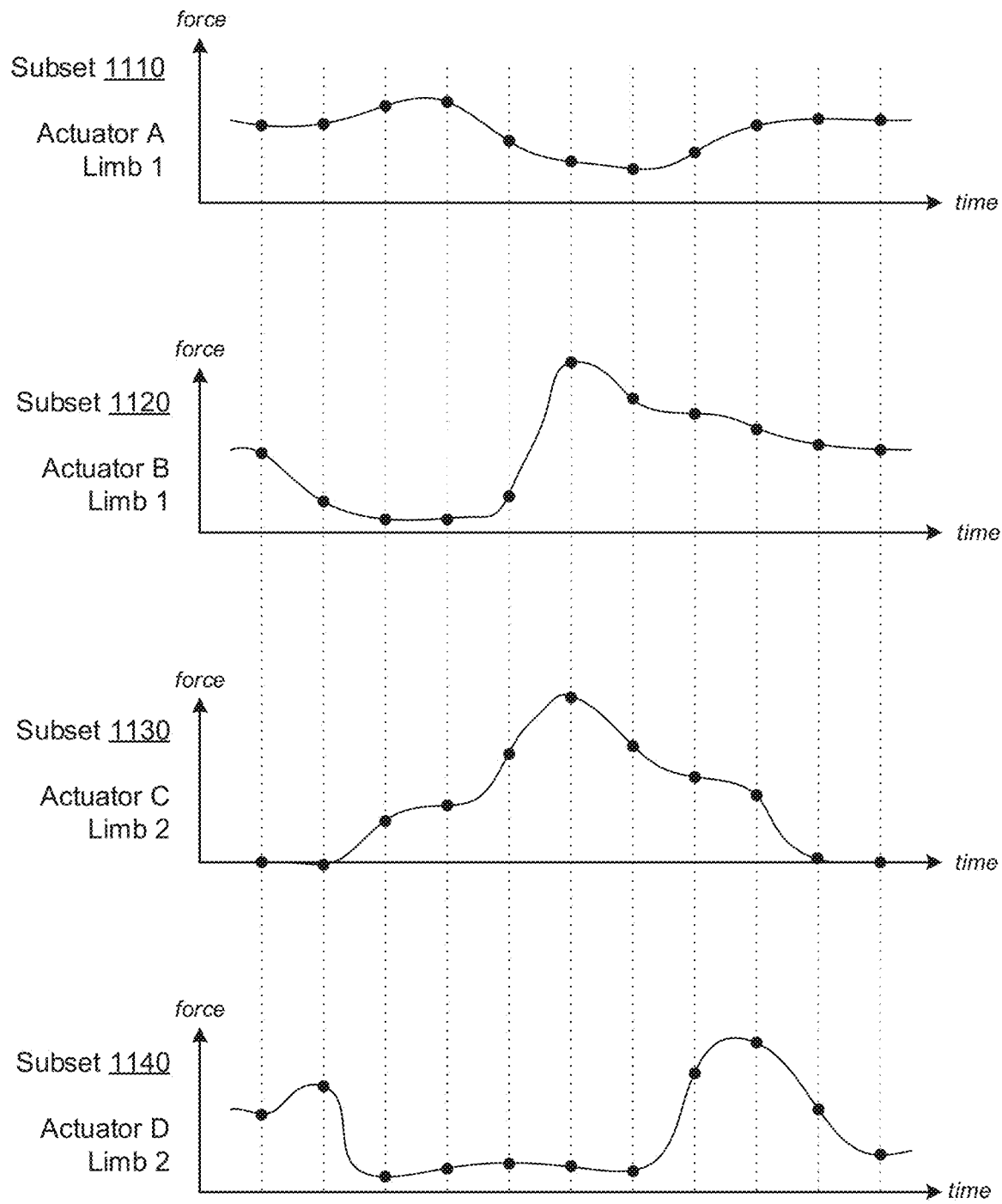
FIG. 11 illustrates example subsets of feed-forward control parameters, according to an example implementation.

While FIG. 6A and FIG. 6B depict two states—a starting state and an ending state—other intervening states (which may also be referred to as "intermediate states") may also be utilized when determining the coordinated motion. An example intervening state may be during the manipulation of an object, such as when the quadruped robot in FIG. 6A and FIG. 6B is in mid-swing and its end effector is gripping onto the brick. Any number of intervening states between the start of the coordinated motion and the end of the coordinated motion may be considered. FIG. 11 depicts example sets of feed-forward parameters that are associated with a respective set of states

IV. Example Control Configuration

Figure 8:
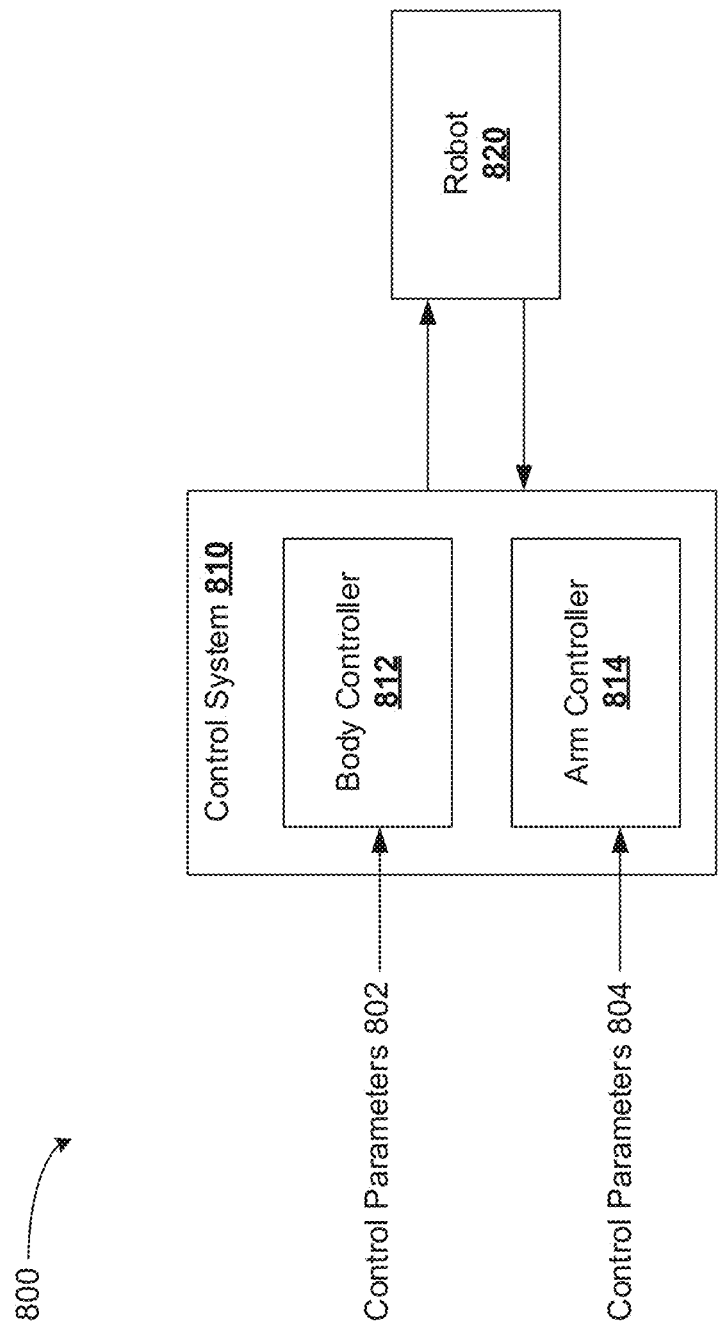
FIG. 8 illustrates an example control configuration, according to an example implementation.

FIG. 8 illustrates a control configuration 800, according to an example implementation. The control configuration 800 may be included on a robot such as robotic device 100, robotic device 200, robotic device 300, robotic device 400, and/or robotic device 500, for example.

The example control configuration 800 includes both a feedback loop and feed-forward control. The control system 810 may utilize the feedback loop to receive information from robot 820 from sensors connected to various portions of the robot 820. In response to receiving information from robot 820, the control system may determine an extent of control effort required for robot 820 to perform various tasks, and provide signals to control actuators on robot 820 accordingly.

The control system 810 may also utilize a feed-forward control system that receives control parameters 802 and 804, which influence the operation of control system 810. In some instances, the control parameters 802 and 804 may influence or bias the feedback system to cause the control system 810 to send control signals to robot 820 for facilitating a transient motion. The control parameters 802 and 804 may be similar to the feed-forward control inputs described in other portions of this application.

In some cases, a robot may include legs and a manipulator arm. The control system 810 may include separate controllers for the body (which includes the body and legs of the robot) and the manipulator arm. The body controller 812 may include a feedback system configured to maintain the robot's balance, or to perform a stable cyclic behavior, such as trotting. In an example situation, the control system 810 receives control parameters 802 and 804, causing the body controller to compress and/or extend the legs of the robot and the arm controller to move the manipulator arm in a coordinated manner. Upon conclusion of the episodic motion, the control system 810 may resume operating in accordance with its original stable or cyclic behavior.

V. Example Operations

Figure 9:
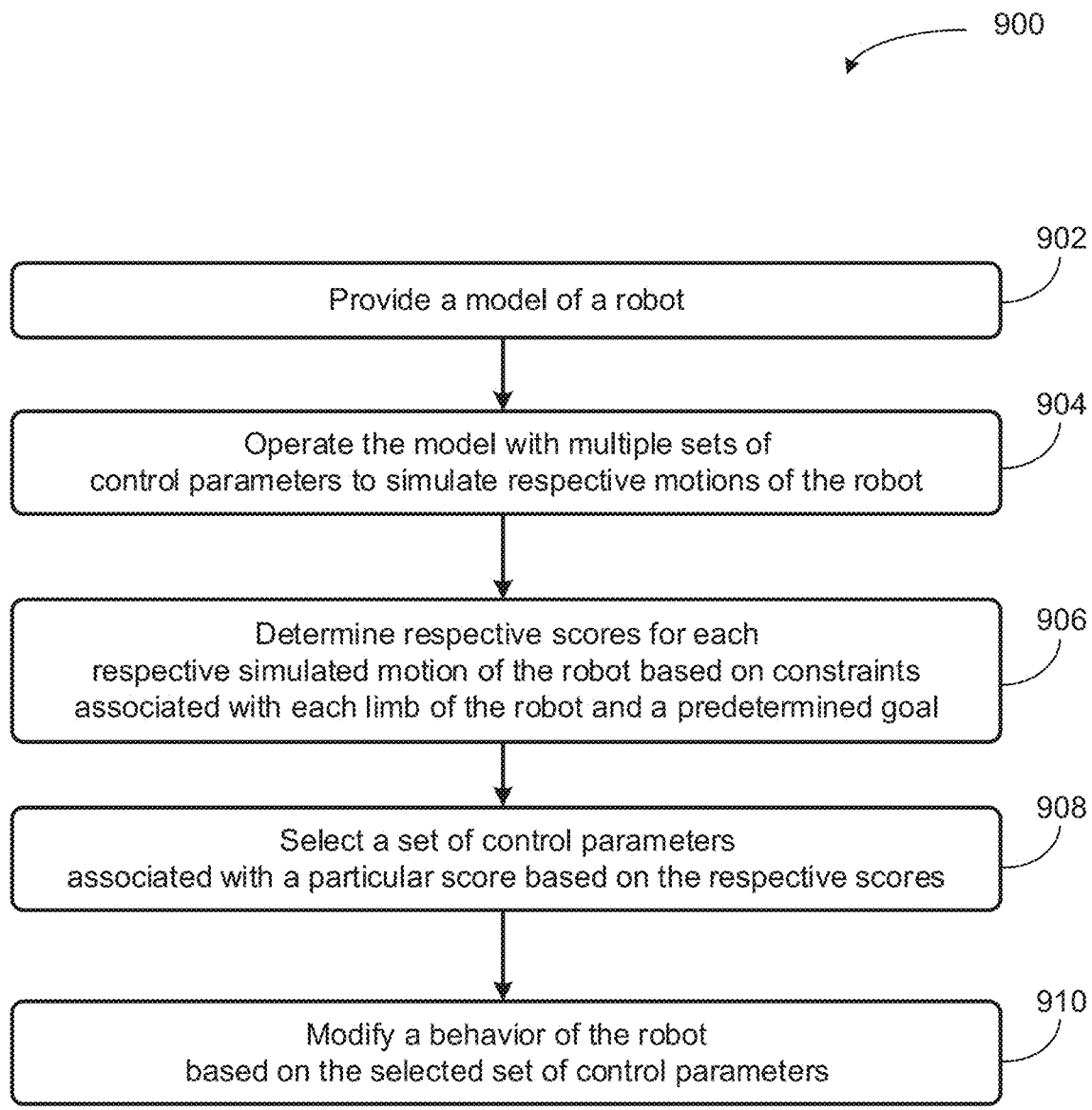
FIG. 9 is a flowchart, according to an example implementation.

FIG. 9 is a flowchart 900, according to an example implementation. The operations in the flowchart 900 and flowchart 1100 shown in FIG. 11, could, for example, be performed by the robotic device 100 in FIG. 1, the robotic device 200 in FIG. 2, the robotic device 300 in FIG. 3, the robotic device 400 in FIG. 4, the robotic device 500 in FIG. 5, or any combination of components from robotic devices 100, 200, 300, 400, or 500. FIG. 9 may include one or more operations or steps as illustrated by one or more of blocks 902, 904, 906, 908, and 910. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 9, FIG. 11, and other procedures and operations described herein, flowchart 900 and flowchart 1100 show the functionality and operation of a possible implementation of present implementations. In this regard, each block may represent a module, a segment, or a portion of program code, which includes one or more instructions executable by a processor for implementing specific logical operations or steps in this process. The program code may be stored on any type of computer-readable medium, for example, such as a memory or hard drive. The computer-readable medium may include a non-transitory computer-readable medium, for example, such as computer-readable media that stores data for short periods of time like register memory, processor cache, and/or random access memory (RAM). The computer-readable medium may also include other non-transitory media, such as secondary or persistent long-term storage, like read-only memory (ROM), for example. The computer-readable media may also be any other volatile or non-volatile storage system. The computer-readable medium may be considered a computer-readable storage medium, a tangible storage device, or other article of manufacture. The program code (or data for the code) may also be stored and/or provided on other media including communication media. For example, the commands and/or instructions may be received via a wireless communication media.

Further, for FIG. 9, FIG. 11, and other procedures and operations described herein, each block may represent circuitry arranged to perform certain logical operations.

Operations of FIG. 9 and FIG. 11 may be fully performed by a single computing device, or may be distributed across multiple computing devices. The computing system may communicate with a control system of a robot by transmitting to the control system feed-forward control inputs, among other information or data. For the purposes of explanation, the operations of blocks 902, 904, 906, 908, and 910 are described as being performed by a computing device.

At step 902, the computing device provides a model of a robot that characterizes the robot's various components their dynamics. The model of the may include information about a particular robot, such as each component's weight, size, shape, and weight distribution. In addition, the model may indicate the manner in which the components are connected to each other, either through a fixed manner or using a joint (e.g. a knuckle joint, a Cardan joint, or a spherical joint) to allow for movement and/or rotation of members about that joint. The model may further include information about the particular robot's actuators that indicate the manner in which they are arranged, along with their weight, size, and shape, among other possible factors.

The model may also characterize physical constraints of the components of the robot. For instance, one or more of the joints may be restricted to operate within a limited range of motion (e.g. 90 degrees to 180 degrees), which may be referred to herein as "joint angle constraints." In addition, the actuators of the robot may be constrained to maximum instantaneous and/or sustained power (e.g. 1 watt to 10 kilowatts) and torque (e.g. 10 newton meters to 10,000 newton meters) or force (e.g. 1 newton to 1,000 newtons) outputs, which may collectively be referred to as "actuator power constraints." Further, the actuators of the robot may be constrained to a maximum velocity (e.g. 0.1 inches/second to 10 inches/second), which may be referred to as "actuator velocity constraints." In some instances, the actuators may include other constraints, such as a maximum pressure, among other possible constraints. Additionally, one or more of the joints may be constrained to operate below a maximum rotational velocity (e.g. 1 radian per second to 10 radians per second), which may be referred to herein as "joint velocity constraints."

Note that "joint constraints" may refer to one or more of joint angle constraints, joint velocity constraints, or any other constraints within which the joints are designated to operate. Additionally, "actuator constraints" may refer to one or more of actuator power constraints, actuator velocity constraints, or any other constraints within which the actuators are designated to operated.

In some implementations, the model of the robot may include a model of the robot's control system. The control system model may characterize the feedback and feed-forward behaviors of the robot's control system that allows the control system to stabilize the robot and to induce a transient motion on the robot via received feed-forward control parameters. The control system model may include separate controllers for certain portions of the robot, such as an arm controller for a manipulator arm of the robot. In some cases, the control system model may prevent an overexertion of the robot's joints and/or actuators by clamping any control output that would violate the joint or actuator's constraints.

In some instances, portions of the robot may be characterized in a simplified or abstracted way in the model. For example, the body of a robot to which the robot's legs are connected may be characterized as a single rigid body, although the physical robot may be more complex. In some cases, the control system model may abstract the operation of joints and/or actuators to allow for higher-level feed-forward control inputs. For example, the control system may be configured to receive foot placement coordinates, instead of specifying a combination of joint angles that would result in the robot's foot being placed at those coordinates. Other abstractions may be implemented as well.

On the other hand, referring to the brick-throwing example scenario described above with respect to FIG. 6A and FIG. 6B, the model of the robot may characterize the dynamics of the quadruped robot's four legs, manipulator arm, and body.

At step 904, the computing device operates the model with multiple sets of control parameters to simulate respective motions of the robot. The computing device may be configured to simulate the robot's motion, along with motion of objects that the robot interacts with, within a certain environment. Models of particular objects and environments may be stored on the computing device and used to simulate the robot's motion for a certain scenario.

The computing device may simulate the motion of the robot in accordance with certain sets of control parameters. The sets of control parameters may be feed-forward control inputs that are provided to the robot's control system, which in turn causes the control system to operate the robot's actuators to execute a transient motion. Referring to the brick-throwing example scenario described above, operating the model with a certain set of control parameters may cause the robot to pick up the brick, swing it across its body, and release it in a coordinated manner.

In some instances, the set of control parameters includes a number of subsets of control parameters that each corresponds to particular portions of the robot, such as a particular leg or a robot's manipulator arm. In the brick-throwing example, the set of control parameters may include subsets of control parameters for each leg and for the manipulator arm.

The set of control parameters may indicate a starting state for each portion of the robot, an ending state for each portion of the robot, and a duration of the motion between the starting and ending state. In some instances, intermediate states may also be included in the set of control parameters. In the brick-throwing example, each leg and the manipulator arm may have a particular set of states and a duration of motion for transitioning between each state such that when the legs and manipulator arm are operated in a coordinated manner corresponding to the set of control parameters, the simulated robot performs a coordinated motion.

The computing device may determine certain aspects of the simulated motion to determine one or more metrics. For example, the angles of each joint and the forces exerted by each actuator over the course of the motion may be stored for use in step 906. Other measurable aspects of the simulation may also be determined and stored for later use. In the brick-throwing example shown in FIG. 6A and FIG. 6B, the position of the brick over the course of the duration may be determined, along with the distance 620 that it traveled between its position 612 at the point of release until position 614 at the moment it hit the ground.

The computing device may operate the model of the robot with multiple sets of control parameters to perform multiple simulations. Measurable aspects of each simulation, such as those described above, may be determined from the each of the simulated motions.

At step 906, the computing device determines a score for each of the simulated motions. The score may be a numerical value that represents the extent to which the simulated motion accomplishes a predetermined goal. The score may also be weighed against any violation of the robot's constraints in addition to the extent to which the simulated motion accomplished the predetermined goal.

In some implementations, the predetermined goal is represented as a mathematical function of at least one of the measurable aspects from the simulation that produces a first sub-score. In some cases, the first sub-score may decrease in value as the measurable aspect approaches a desired value that represents the predetermined goal, such that a simulation that perfectly achieves the predetermined goal would result in a score of zero. In the brick-throwing example, the first sub-score may be a function of the distance 620 that the brick was thrown, such that a greater distance would produce a lower first sub-score and a shorter distance would produce a higher first sub-score. In the brick-throwing example, the first sub-score is proportional to the distance 620 that the brick was thrown.

In some implementations, the computing system determines a second sub-score that indicates the extent to which the robot's simulated motion violates its constraints. The second sub-score may be a function of the measured joint angles and actuator forces from the simulated motion. In some cases, the second sub-score may increase in value as the measured joint angles and actuator forces approach the constraints. In other cases, the second sub-score sharply increases in value as the measured joint angles and actuator forces exceed the constraints. In the brick-throwing example, the second sub-score is proportional to the extent to which the maximum measured force and the maximum measured power of the actuators exceeded the constraints. As another example, the second sub-score may be inversely proportional to the power used to generate the coordinated motion.

The computing device then calculates the score based on the first sub-score and the second sub-score. In some implementations, the score is a linear combination of the first sub-score and the second sub-score, where the sub-scores have certain predefined weighting constants that make the first sub-score and second sub-score vary a comparable amount (i.e. so that one sub-score does not dominate the other).

In some instances, more than one constraint and/or predetermined goal may be present in a particular scenario. In these instances, multiple sub-scores may be determined in a similar manner to the sub-score determination described above and combined to determine the score.

At step 908, the computing device selects a particular set of control parameters that correspond to a particular score from among the determined scores. In some implementations, scores having lower values indicate the simulated motions that produced the best results and didn't violate (or minimally violated) the constraints. In these implementations, the computing device may select the set of control parameters corresponding to the lowest determined score. Other implementations may produce higher scores for more desirable results; in these cases, the computing device would select the highest score. Regardless of the implementation, the computing device selects the set of control parameters associated with the score that represents the best simulation (or one of the better simulations) that achieves the predetermined goal within the specified constraints.

In some cases, the selected set of control parameters violated one or more constraints during the simulation. The computing device might select such a set of control parameters when, for example, the associated score is better than the other determined scores. For instance, violating the constraints might cause the simulated robot to achieve the predetermined goal to a far greater extent than other simulated motions that comply with the constraints. In other instances, the computing device might determine that achieving the predetermined goal requires the robot to operate beyond its constraints. When operating the robot beyond its designated limitations, the control system of the robot employs one or more recovery strategies to maintain the robot's balance and, upon completion of the transient motion, returns to a steady-state or cyclic behavior.

In the object-throwing example, the predetermined goal could be, for example, to have the robot throw the object at least 10 feet away. The computing device might simulate many sets of control parameters and determine that the only simulations that result in the object being thrown over 10 feet away violate constraints of the robot. Violating these constraints might result in the robot losing its balance and falling over. In such instances, employing a passive and/or active recovery strategy could restore the robot's balance. For example, after releasing the object from the robot's manipulator arm, the robot might step in a certain direction, swing its manipulator arm in a certain manner, or lean its body in a certain way so as to prevent the robot from losing its balance.

In some implementations, the robot's control system attempts to maintain the robot's balance by employing a feedback recovery strategy. A feedback recovery strategy might involve determining an amount of force to exert by a robot's legs onto the ground and/or locations to place the robot's feet that maintains the robot's balance. An example feedback recovery strategy uses the control system's steady-state or cyclic control.

In other implementations, the robot's control system attempts to maintain the robot's balance by employing a feed-forward recovery strategy. When simulating a particular set of control parameters that produces a robot motion that violates the robot's constraints, the computing device might determine the direction and/or orientation of the robot's momentum, joint angles, translational and/or rotational velocity, and other information about the state of the robot at the end of the transient motion. Based on the robot's state at the completion of the transient motion, the computing device may calculate a corrective set of control parameters that operate the robot's actuators such that the robot's balance is maintained. This corrective set of control parameters may be provided to the robot's control system upon completion of the transient motion, which causes the robot to execute a recovery motion that balances the robot.

A combination of feedback and feed-forward recovery strategies might also be employed. Minor violations of the constraints could cause a slight imbalance to the robot, and the robot's control system could primarily utilize a feedback recovery strategy to restore balance. Greater constraint violations that cause significant imbalances to the robot might require, in addition to the feedback recovery strategy, an active application of feed-forward control inputs to correct for the imbalance by operating the robot's actuators. Certain circumstances might also require multiple corrective sets of control parameters applied at certain times to dampen the imbalance over time.

At step 910, the computing device modifies the behavior of a robot based on the selected set of control parameters. In some implementations, the computing device provides the selected set of control parameters as feed-forward control inputs to the robot. The feed-forward inputs received at the robot may then cause the robot's control system to perform a coordinated motion corresponding to the selected set of control parameters.

FIG. 10 illustrates example sets of control parameters and their respective scores, according to an example implementation. Set 1010 and set 1020 are merely example sets of control parameters and are provided for explanatory purposes. Set 1010 and set 1020 may depict a subset of a set of control parameters corresponding to a portion of a robotic device. The sets of control parameters 1010 and 1020 may be provided to a control system of robotic device 100, robotic device 200, robotic device 300, robotic device 400, and/or robotic device 500 for performing a coordinated motion.

The sets of control parameters 1010 and 1020 include starting and ending values for a joint and an actuator. Both the joint and the actuator have constraints, illustrated as a "Limit" in FIG. 10. The sets of control parameters 1010 and 1020 also include a duration of motion. Although one duration is depicted in FIG. 10, a set of control parameters may include multiple durations of motion, each corresponding to a particular joint or actuator. Further, the durations may include other timing parameters that indicate a time offset used to coordinate the timing of the movement and/or actuation of various robotic components. In addition to the joint values, actuator values, and the duration of the motion, the sets of control parameters 1010 and 1020 each associated with a particular score.

During operation, a computing device may determine the starting and ending values of set 1010 and set 1020, possibly in addition to the starting and ending values of others sets of control parameters. The computing device may then operate a model of a robotic device with set 1010 and set 1020 to simulate motions of the robotic device in a similar manner to that described in step 904. For example, during the simulation of the robotic device for set 1010, the robotic device is instructed to operate the joint from 120 degrees to 180 degrees over a 0.8 second period of time.

Then, the computing device may determine respective scores for set 1010 and set 1020 based on the constraints and a predetermined goal in a similar manner to that described in step 906. The computing device may determine changes in the joint angle and the actuator force over the duration of the motion, which are depicted as graphs in FIG. 10. The computing device may determine the minimum and/or maximum values of the joint angle and the actuator force from the simulated motion. The maximum values are illustrated as a dot on each graph. In determining the score set 1010 and set 1020, the computing device may determine sub-scores as described above.

As shown in FIG. 10, the simulated motion corresponding to set 1010 exceeded both the joint constraint (189 degrees exceeds the upper limit of 180 degrees) and the actuator constraint (18 newtons exceeds the upper limit of 10 newtons); accordingly, the score associated with the simulation (5.25) is relatively high. In comparison, the simulated motion corresponding to set 1020 does not exceed either the joint constraint (171 degrees is within the limit of 90 degrees to 180 degrees) nor the actuator constraint (10 newtons is within the limit of 0 newtons to 15 newtons); accordingly, the score associated with the simulation (1.5) is much lower than the score associated with set 1010. Note that the scores may also depend upon the extent to which the simulated motion achieves a predetermined goal.

FIG. 11 depicts example subsets of feed-forward control parameters, according to an example implementation. Note the subsets 1110, 1120, 1130, and 1140 shown in FIG. 11 are provided for explanatory purposes, and might not relate to any particular desired motion. Other subsets of feed-forward control parameters can be used.

In the example shown in FIG. 11, Limb 1 includes Actuator A and Actuator B, and Limb 2 includes Actuator C and Actuator D. During operation, the robot receives a set of feed-forward control parameters that include subsets 1110, 1120, 1130, and 1140. Subset 1110 represents forces to exert at Actuator A over a period of time. Similarly, subsets 1120, 1130, and 1140 represent forces to exert at Actuators B, C, and D, respectively, over the period of time. Collectively, the subsets 1110, 1120, 1130, and 1140 represent a coordinated control effort involving the exertion of forces by Actuators A, B, C, and D over the period of time.

When the subsets 1110, 1120, 1130, and 1140 are activated by the robot (or the robot's control system), the actuators begin exerting forces of a magnitude shown in the graphs of FIG. 11. The dotted lines spanning across the graphs represent time intervals, and the black circles at the intersection of those dotted lines and the force curves represent the magnitude (i.e. extent) of force to exert for that particular actuator at that point in time. Thus, at a given point in time during the execution of the motion, each actuator is individually exerting a force with a magnitude specified by the feed-forward control parameters. Through this simultaneous actuation, a coordinated exertion of forces is achieved.

During the execution of the coordinated motion, the feed-forward control parameters might periodically (e.g. at the points in time represented by the black circles) cause each actuator to exert a force having a magnitude designated by its respective subset of feed-forward control parameters. As time progresses, each actuator exerts forces as specified by the subsequent values in its respective subset. In some implementations, each subset includes a plurality of force values (represented by the black circles along the force curves in FIG. 11) that each indicate the magnitude of force to exert at the actuator at a certain point in time. The points in time represented on the y axis may indicate time offsets from the start of the execution of the coordinated motion. The coordinated exertion of forces by the robot's actuators induces the robot to perform a coordinated motion. Once there is no subsequent value in the subsets specifying forces to exert for the actuators, the coordinated motion ends. Subsequently, feedback stabilization or recovery strategies may be employed.

In some implementations, the forces exerted by the actuators are not coordinated in time. Thus, each actuator can operate independently from the others. In other implementations, the force values might not all align to the same points in time indicated by the dotted lines in FIG. 11. Also, a given subset might contain fewer or more force values than other subsets, which can span over a period of time that is shorter or longer than the other subsets. The coordinated motion performed as a result of executing the subsets can be performed iteratively any number of times (e.g. 1 iteration to 10 iterations) as well.

Consider the object-throwing example above. A certain set of feed-forward control parameters, which coordinate the forces exerted by the robot's legs, torso, and manipulator arm, might cause the robot to throw the object a greater distance compared to solely operating the manipulator arm. As the manipulator arm swings across the robot's body, certain legs might compress, while other legs are extending, causing a buildup of momentum in the object before it is released. Coordinating the compression and extension of the legs—including the amount of compression and extension, the rate in which to compress or extend, and the point in time during the motion at which to begin compressing or extending—is accomplished by providing a set of feed-forward control parameters to the robot (or a control system of the robot). The feed-forward control parameters include subsets associated with the actuators of the robot's legs and manipulator arm, similarly to those depicted in FIG. 11.

Figure 12:
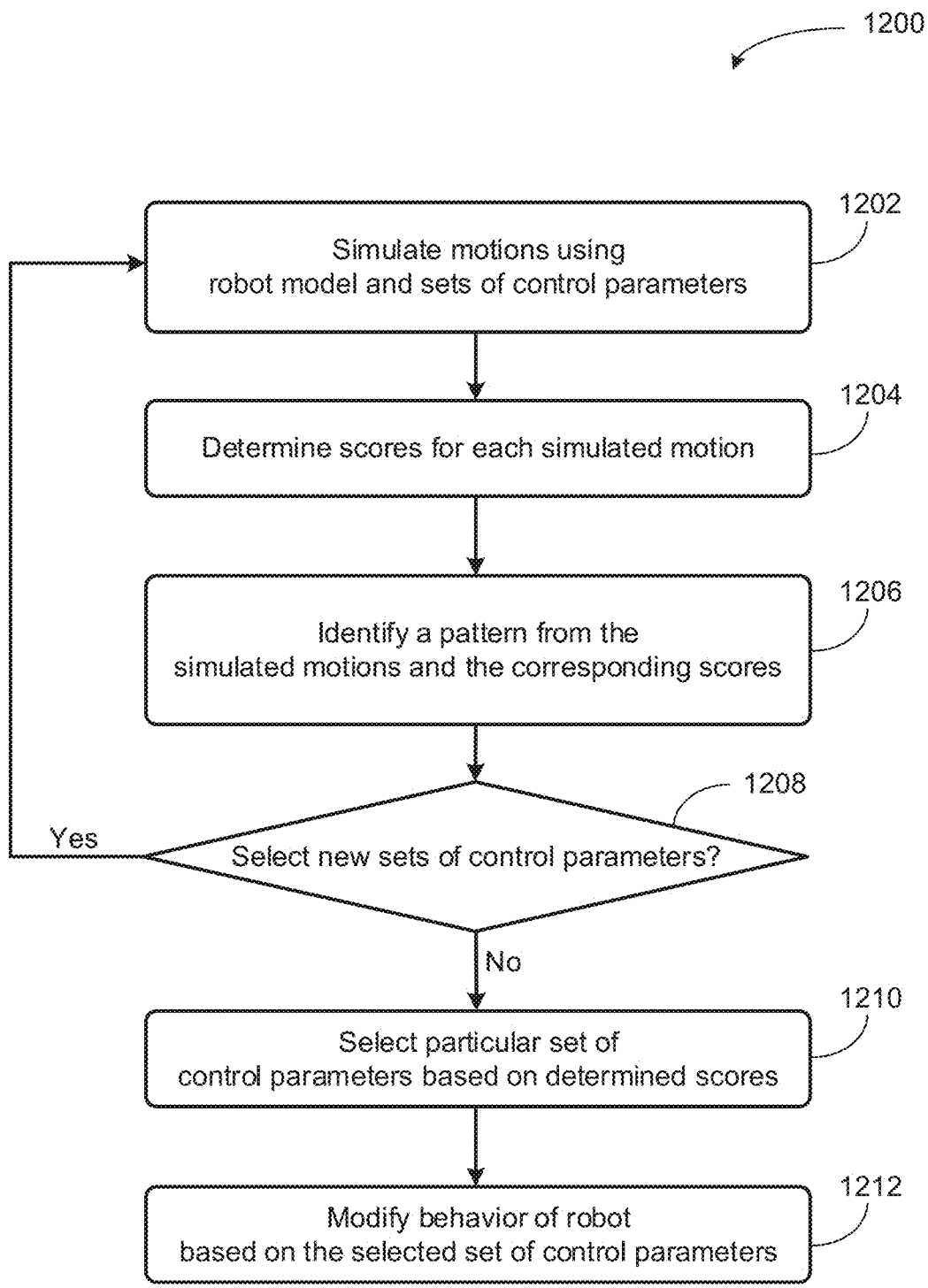
FIG. 12 is a flowchart, according to an example implementation.

FIG. 12 is a flowchart 1200, according to an example implementation. The operations shown in FIG. 12 may be performed in addition to one or more of the operations shown in FIG. 9. The operations in flowchart 1200 describe an example implementation of determining a set of control parameters to use in modifying the behavior of a robot.

In some instances, a robot's motion is simulated using initial sets of control parameters, and the simulation results produced may indicate unsatisfactory scores. The simulation results obtained using the initial sets of control parameters may violate the constraints and/or produce suboptimal results that are far from accomplishing the predetermined goal. Accordingly, in some implementations, certain operations may be iteratively performed in order to produce a suitable set of control parameters with which to modify the robot's behavior.

At step 1202, the computing device simulates motions of the robot using the robot model and initial sets of control parameters, similarly to the simulations described in step 904.

At step 1204, the computing device determines scores for each of the simulated robot motions, similarly to the scoring described in step 906.

At step 1206, the computing device identifies a pattern from the simulated motions and the respective scores. After the scores have been determined in step 1204, the computing device may compare previously simulated sets of control parameters and determine a pattern or trend that indicates a manner of varying individual control parameters that results in more desirable scores. For example, the computing device may determine that when a particular control parameter is increased and a different control parameter is decreased, the resulting score tends to decrease. Such patterns or trends may be utilized by the computing device to generate a different set of control parameters that the computing device expects to produce more optimal simulation results. In some instances, a set of control parameters may include many control parameters (e.g. 5 control parameters to 20 control parameters), and the resulting pattern or trend may be in a multi-dimensional space.

In some implementations, the computing device may use the pattern or trend as a basis for recommending control parameter values to a user.

In some implementations, the operations performed at step 1204 and step 1206 may be performed on multiple computing devices and/or processors. Parallelizing the execution of these operations may reduce the time required to perform the simulations and scoring.

At step 1208, the computing device determines whether to select a new set of control parameters and repeat steps 1202, 1204, and 1206, or to proceed with determining the scores. In some cases, the computing device may determine that at least one of the determined scores is adequate and/or accomplishes the goal to a sufficient extent without possibly causing damage by exceeding any of the robot's constraints. In these cases, the computing device may proceed to step 1210. In other cases, however, the computing device may determine that the scores produced are unacceptable; in these cases, the computing device may select a different set of control parameters based on the identified pattern or patterns to be simulated and scored.

The computing device may also determine one or more statistical metrics from the determined scores. For example, the variance and/or standard deviation may be calculated from the determined scores. In some implementations, the computing device may proceed to step 1210 if the variance and/or standard deviation is sufficiently small, indicating that the scores are relatively close in value and thus are likely converging to an optimal or near-optimal set of control parameters. If the variance and/or standard deviation is too large (i.e. exceeds a threshold variance and/or standard deviation), the computing device may utilize the identified pattern to select new sets of control parameters to be simulated and scored.

In some cases, steps 1202, 1204, 1206, and 1208 may be repeated a number of times (e.g. 2 times to 20 times). After a few iterations of these steps, the computing device may identify more accurately one or more trends or patterns that specify control parameter variations that converge to a certain simulation score. In some instances, this convergence may indicate an optimal or near-optimal simulation result that achieves the predetermined goal. In other instances, however, the score convergence may be a local maximum or minimum (depending upon the particular implementation), where a more desirable score may result from a different set of control parameters. In these instances, the set of control parameters that produced a score near the local maximum or minimum may be satisfactory, and the computing device proceeds to step 1210. In some cases, the computing device may find the produced score unsatisfactory, and thus perform more simulations with other sets of control parameters in order to find a more optimal solution.

At step 1210, the computing device selects a particular set of control parameters from among the previously simulated sets of control parameters based on the determined scores, similarly to the selecting operation in step 908.

At step 1212, the computing device modifies a behavior of the robot based on the selected set of control parameters, similarly to the modification operation in step 910. Modifying the behavior of the robot in step 910 and/or step 1212 may involve setting the selected set of control parameters to the robot and restricting the robot to carry out a coordinated motion based on the selected set of control parameters.

VI. Example Computer-Readable Medium

Figure 13:
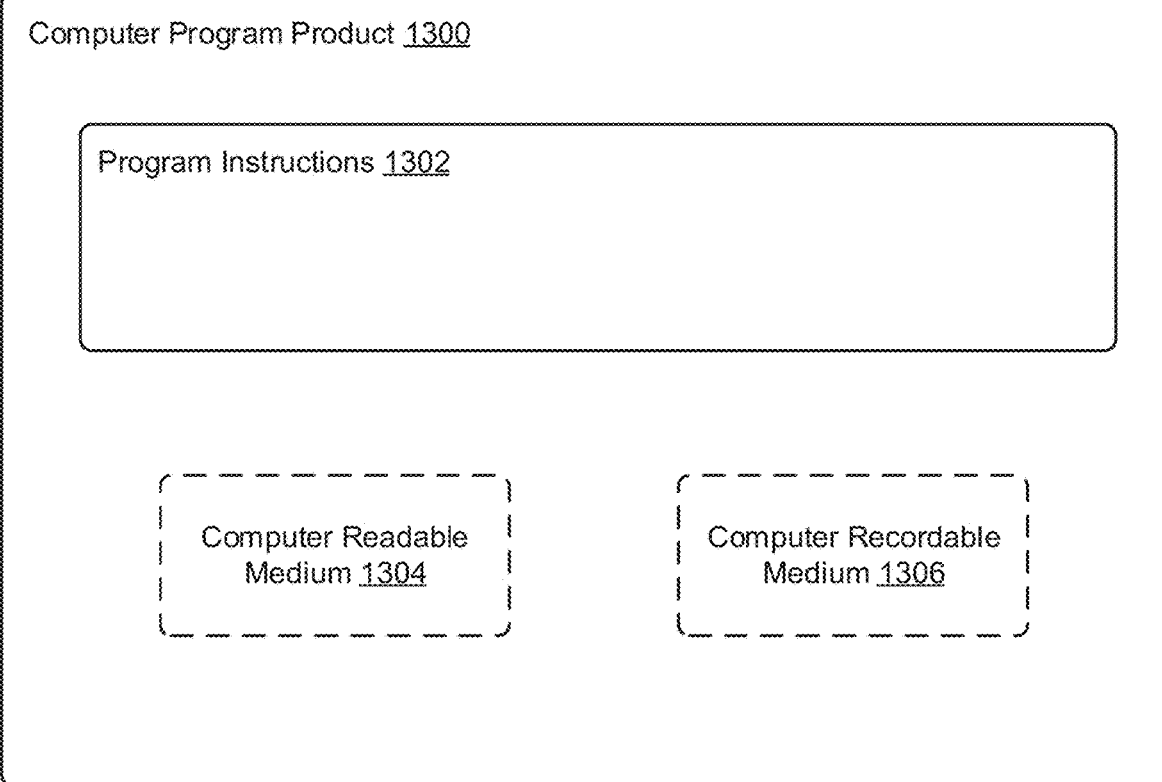
FIG. 13 is a computer-readable medium configured according to an example implementation.

FIG. 13 illustrates an example computer-readable medium configured according to at least some implementation described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 13 is a schematic illustrating a conceptual partial view of a computer program product that includes a computer program for executing a computer process on a computing device, arranged according to at least some implementations disclosed herein.

In some implementations, the example computer program product 1300 may include one or more program instructions 1302 that, when executed by one or more processors may provide functionality or portions of the functionality described above with respect to FIGS. 1-12. In some examples, the computer program product 1300 may include a computer-readable medium 1304, such as, but not limited to, a hard disk drive, a Compact Disc (CD), a Digital Video Disk (DVD), a digital tape, memory, etc. In some implementations, the computer program product 1300 may include a computer recordable medium 1306, such as, but not limited to, memory, read/write (R/W) CDs, R/W DVDs, etc.

The one or more program instructions 1302 can be, for example, computer executable and/or logic implemented instructions. In some examples, a computing device is configured to provide various operations, or actions in response to the program instructions 1302 conveyed to the computing device by the computer readable medium 1304 and/or the computer recordable medium 1306. In other examples, the computing device can be an external device in communication with a device coupled to the robotic device.

The computer readable medium 1304 can also be distributed among multiple data storage elements, which could be remotely located from each other. The computing device that executes some or all of the stored instructions could be an external computer, or a mobile computing platform, such as a smartphone, tablet device, personal computer, or a wearable device, among others. Alternatively, the computing device that executes some or all of the stored instructions could be a remotely located computer system, such as a server. For example, the computer program product 1300 can implement operations discussed in reference to FIG. 9 and/or FIG. 12.

VII. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   simulating, by a computing device of a limbed robot, a motion of the limbed robot with a set of control parameters using a model, the set of control parameters representing a first exertion of force by an actuator of the limbed robot;
   determining, by the computing device, a score for the simulated motion of the limbed robot based on a predetermined goal and one or more constraints, the one or more constraints representing a full physical range of motion of at least one limb of the limbed robot, wherein determining the score comprises:
      determining a first sub-score based on a relationship between a first measurable aspect of the simulated motion and the predetermined goal;
      determining a second sub-score based on a comparison between a second measurable aspect of the simulated motion and the full physical range of motion of the one or more constraints associated with the at least one limb of the limbed robot; and
      calculating the score based on the first sub-score and the second sub-score;
   selecting, by the computing device, the set of control parameters based on the score; and
   actuating, by the computing device, the actuator to exert the exertion of force that is associated with the selected set of control parameters.

2. The method of claim 1, wherein the first sub-score decreases in value as the first measurable aspect approaches a desired value that represents the predetermined goal.

3. The method of claim 1, wherein the second sub-score is a function of one or more measured joint angles for the limbed robot and one or more actuator forces from the simulated motion of the limbed robot.

4. The method of claim 1, wherein calculating the score based on the first sub-score and the second sub-score comprises generating a linear combination of the first sub-score and the second sub-score.

5. The method of claim 1, wherein the motion of the limbed robot simulated with the set of control parameters using the model corresponds to a respective motion for a single actuator associated with the limbed robot.

6. The method of claim 1, wherein the motion of the limbed robot simulated with the set of control parameters using the model corresponds to a respective motion for a limb of the limbed robot.

7. The method of claim 1, wherein the one or more constraints further represent an operable range of forces for the actuator.

8. The method of claim 1, wherein actuating the actuator to exert the exertion of force that is associated with the selected set of control parameters comprises:
   transitioning from a first mode of operation to a second mode of operation, the first mode of operation comprising a steady-state mode of operation that balances the robot and the second mode of operation comprising a transient mode of operation that causes the robot to:
      operate the actuator in a starting state; and
      transition the actuator from the starting state to an ending state over a duration of time; and
   upon completion of the second mode of operation, transitioning from the second mode of operation to the first mode of operation.

9. The method of claim 1, wherein the set of control parameters includes a plurality of force values, and wherein actuating the actuator to exert the exertion of force comprises:
   exerting a first magnitude of force specified by an initial force value from the plurality of force values of the selected set of control parameters; and
   exerting a second magnitude of force specified by a subsequent force value from the plurality of force values of the selected set of control parameters.

10. A method comprising:
    simulating, by a computing device of a limbed robot, a motion of the limbed robot with a set of control parameters using a model, the set of control parameters representing a first exertion of force by an actuator of the limbed robot;
    determining, by the computing device, a score for the simulated motion of the limbed robot based on constraints associated with at least one limb of the limbed robot and a predetermined goal, wherein determining the score comprises:
       determining a first sub-score based on a relationship between a first measurable aspect of the simulated motion and the predetermined goal;
       determining a second sub-score based on a relationship between a second measurable aspect of the simulated motion and the constraints associated with the at least one limb of the limbed robot; and
       calculating the score based on the first sub-score and the second sub-score;
    selecting, by the computing device, the set of control parameters based on the score; and
    actuating, by the computing device, the actuator to exert the exertion of force that is associated with the selected set of control parameters,
    wherein the second sub-score is a function of one or more measured joint angles for the limbed robot and one or more actuator forces from the simulated motion of the limbed robot, and
    wherein the second sub-score increases in value as the one or more measured joint angles and the one or more actuator forces approach the constraints.

11. A limbed robot comprising:
    an actuator;
    a processor; and
    a memory storing a model of the robot and program logic, the program logic executable by the processor to cause the robot to perform operations comprising:
       simulating a motion of the limbed robot with a set of control parameters using the model, the set of control parameters representing a first exertion of force by the actuator of the limbed robot;
       determining a score for the simulated motion of the limbed robot based on a predetermined goal and one or more constraints, the one or more constraints representing a full physical range of motion of at least one limb of the limbed robot, wherein determining the score comprises:
          determining a first sub-score based on a relationship between a first measurable aspect of the simulated motion and the predetermined goal;
          determining a second sub-score based on a comparison between a second measurable aspect of the simulated motion and the full physical range of motion of the one or more constraints associated with the at least one limb of the limbed robot; and calculating the score based on the first sub-score and the second sub-score;

selecting the set of control parameters based on the score; and actuating the actuator to exert the exertion of force that is associated with the selected set of control parameters.

12. The limbed robot of claim 11, wherein the first sub-score decreases in value as the first measurable aspect approaches a desired value that represents the predetermined goal.

13. The limbed robot of claim 11, wherein the second sub-score is a function of one or more measured joint angles for the limbed robot and one or more actuator forces from the simulated motion of the limbed robot.

14. The limbed robot of claim 11, wherein calculating the score based on the first sub-score and the second sub-score comprises generating a linear combination of the first sub-score and the second sub-score.

15. The limbed robot of claim 11, wherein the motion of the limbed robot simulated with the set of control parameters using the model corresponds to a respective motion for a single actuator associated with the limbed robot.

16. The limbed robot of claim 11, wherein the motion of the limbed robot simulated with the set of control parameters using the model corresponds to a respective motion for a limb of the limbed robot.

17. The limbed robot of claim 11, wherein the one or more constraints further represent an operable range of forces for the actuator.

18. The limbed robot of claim 11, wherein actuating the actuator to exert the exertion of force that is associated with the selected set of control parameters comprises:

transitioning from a first mode of operation to a second mode of operation, the first mode of operation comprising a steady-state mode of operation that balances the robot and the second mode of operation comprising a transient mode of operation that causes the robot to:

operate the actuator in a starting state; and transition the actuator from the starting state to an ending state over a duration of time; and upon completion of the second mode of operation, transitioning from the second mode of operation to the first mode of operation.

19. The limbed robot of claim 11, wherein the set of control parameters includes a plurality of force values, and wherein actuating the actuator to exert the exertion of force comprises:

exerting a first magnitude of force specified by an initial force value from the plurality of force values of the selected set of control parameters; and exerting a second magnitude of force specified by a subsequent force value from the plurality of force values of the selected set of control parameters.

20. A limbed robot comprising:

an actuator;

a processor; and a memory storing a model of the robot and program logic, the program logic executable by the processor to cause the robot to perform operations comprising:

simulating a motion of the limbed robot with a set of control parameters using the model, the set of control parameters representing a first exertion of force by the actuator of the limbed robot;

determining a score for the simulated motion of the limbed robot based on constraints associated with at least one limb of the limbed robot and a predetermined goal, wherein determining the score comprises:

determining a first sub-score based on a relationship between a first measurable aspect of the simulated motion and the predetermined goal;

determining a second sub-score based on a relationship between a second measurable aspect of the simulated motion and the constraints associated with the at least one limb of the limbed robot; and calculating the score based on the first sub-score and the second sub-score;

selecting the set of control parameters based on the score; and actuating the actuator to exert the exertion of force that is associated with the selected set of control parameters, wherein the second sub-score is a function of one or more measured joint angles for the limbed robot and one or more actuator forces from the simulated motion of the limbed robot, and wherein the second sub-score increases in value as the one or more measured joint angles and the one or more actuator forces approach the constraints.

* * * * *